(12) United States Patent
Kazmi et al.

(10) Patent No.: US 12,689,918 B2
(45) Date of Patent: Jul. 21, 2026

(54) RTT MEASUREMENT PROCEDURE BASED ON DL AND UL REFERENCE SIGNAL RELATIONS

(71) Applicant: Telefonaktiebolaget LM Ericsson (publ), Stockholm (SE)

(72) Inventors: Muhammad Ali Kazmi, Sundbyberg (SE); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 579 days.

(21) Appl. No.: 17/798,204

(22) PCT Filed: Feb. 12, 2021

(86) PCT No.: PCT/EP2021/053532

§ 371 (c)(1),
(2) Date: Aug. 8, 2022

(87) PCT Pub. No.: WO2021/160847

PCT Pub. Date: Aug. 19, 2021

(65) Prior Publication Data

US 2023/0105265 A1     Apr. 6, 2023

Related U.S. Application Data

(60) Provisional application No. 62/975,910, filed on Feb. 13, 2020.

(51) Int. Cl.
H04W 24/08 (2009.01)

(52) U.S. Cl.
CPC ................................... H04W 24/08 (2013.01)

(58) Field of Classification Search
CPC ................................................... H04W 24/08
See application file for complete search history.

(56) References Cited

U.S. PATENT DOCUMENTS 9,571,624 B2 * 2/2017 Cohn .................... H04W 76/30
2014/0086284 A1 * 3/2014 Lakhzouri ............ G01S 5/0273
375/342

(Continued)

FOREIGN PATENT DOCUMENTS

CN        104641250 A    5/2015
CN        109804575 A    5/2019

(Continued)

OTHER PUBLICATIONS

International Search Report and Written Opinion dated May 31, 2021 for International Application No. PCT/EP2021/053532 filed Feb. 12, 2021; consisting of 13 pages.

(Continued)

*Primary Examiner* — Benjamin Lamont
(74) *Attorney, Agent, or Firm* — Weisberg I.P. Law, P.A.

(57) ABSTRACT

Methods and devices are disclosed wherein a network node is configured to communicate with at least one of a second network node and a wireless device (WD). A network node is configured to perform at least one round trip time, RTT, measurement over a measurement time, the measurement time being a function of at least an association between a first periodicity of a first reference signal and a second periodicity of a second reference signal, the first reference signal being received by the network node from a wireless device, WD, and the second reference signal being transmitted from the network node to the WD. A WD is configured to perform one or more operational tasks using the results of the at least one RTT measurement.

21 Claims, 9 Drawing Sheets

(56)                References Cited

U.S. PATENT DOCUMENTS

| | | | | |
|---|---|---|---|---|
| 2014/0126403 A1* | 5/2014 | Siomina | ............... | H04W 24/10 |
| | | | | 370/252 |
| 2019/0245649 A1* | 8/2019 | Siomina | ............... | H04L 1/0026 |
| 2019/0254076 A1* | 8/2019 | Siomina | ................... | H04L 5/00 |
| 2019/0260487 A1* | 8/2019 | Kazmi | ................ | H04B 17/382 |
| 2020/0067661 A1* | 2/2020 | Siomina | ............... | G01S 5/0036 |
| 2020/0127784 A1* | 4/2020 | Akkarakaran | ...... | H04W 72/044 |
| 2020/0267683 A1* | 8/2020 | Edge | .................... | G01S 13/767 |
| 2022/0095296 A1* | 3/2022 | Franke | ................ | G01S 5/0236 |
| 2022/0201531 A1* | 6/2022 | Huang | ................ | H04W 4/027 |

FOREIGN PATENT DOCUMENTS

| | | |
|---|---|---|
| CN | 110036685 A | 7/2019 |
| CN | 110249570 A | 9/2019 |
| CN | 110650494 A | 1/2020 |
| EP | 1285552 | 11/2001 |
| EP | 2898338 | 3/2014 |
| WO | 2018083630 A1 | 5/2018 |

OTHER PUBLICATIONS

Chinese Office Action and English Machine Translation dated Jun. 28, 2025 for Application No. 202180028169.6, consisting of 14 pages.

Chinese Notice of Allowance and English Translation dated May 27, 2026 for Application No. 202180028169.6, consisting of 6 pages.

* cited by examiner

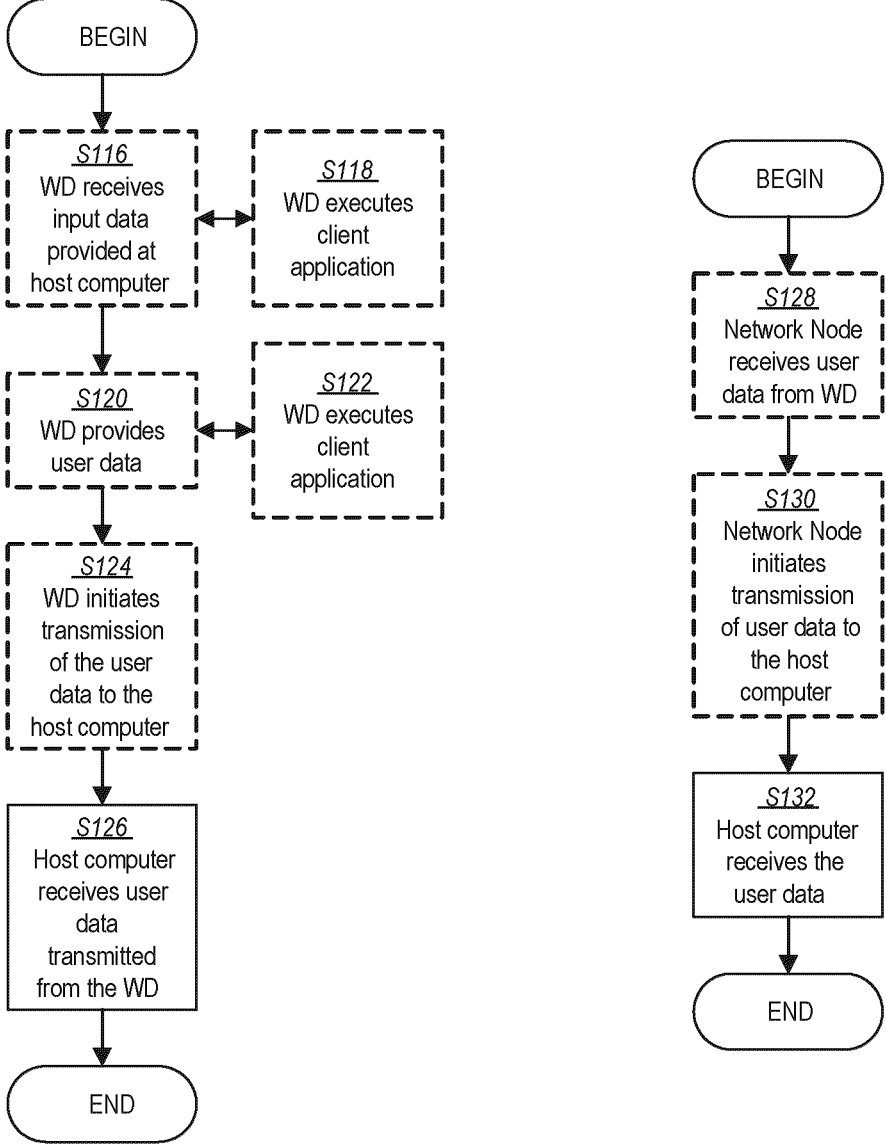
FIG. 6                          FIG. 7

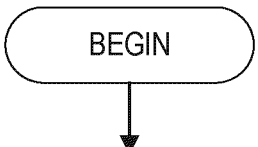

Perform at least one round trip time (RTT) measurement over a measurement time (Tm), the at least one RTT measurement being a function of at least an association between a periodicity ($T_{RS1}$) of a first reference signal (RS1) transmitted from the network node to at least one of a second network node and a WD and a periodicity ($T_{RS2}$) of a second reference signal (RS2) transmitted from the at least one of a second network node and a WD to the network node
S134

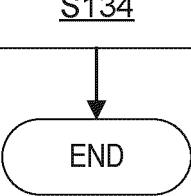

FIG. 8

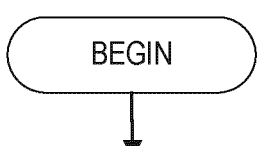

Perform at least one round trip time (RTT) measurement over a measurement time (Tm), the at least one RTT measurement being a function of at least an association between a periodicity ($T_{RS1}$) of a first reference signal (RS1) transmitted from the WD to the at least one of a network node and a second WD and a periodicity ($T_{RS2}$) of a second reference signal (RS2) transmitted from the at least one of a network node and a second WD to the WD
S136

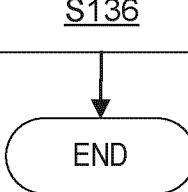

FIG. 9

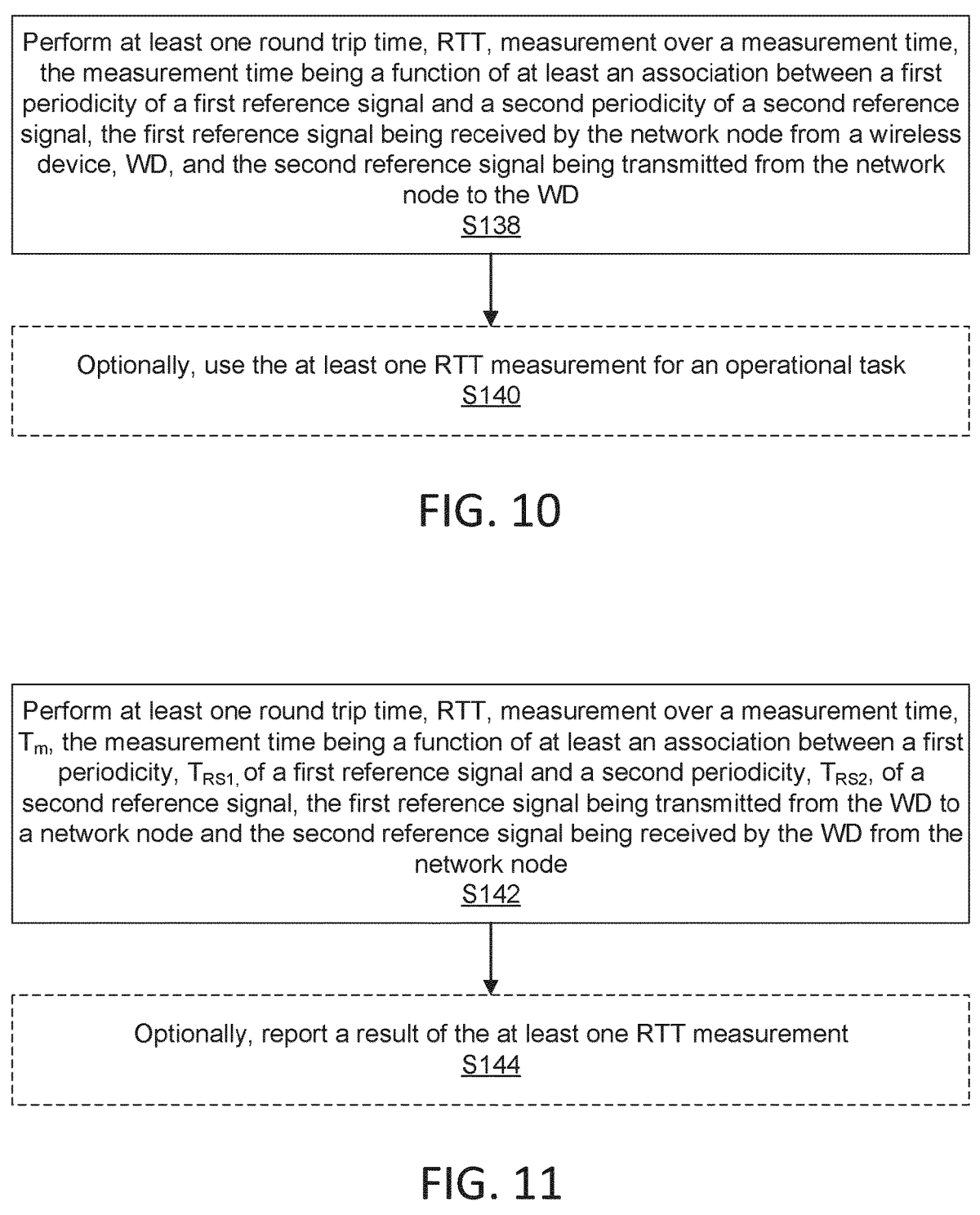

Perform at least one round trip time, RTT, measurement over a measurement time, the measurement time being a function of at least an association between a first periodicity of a first reference signal and a second periodicity of a second reference signal, the first reference signal being received by the network node from a wireless device, WD, and the second reference signal being transmitted from the network node to the WD
S138

Optionally, use the at least one RTT measurement for an operational task
S140

FIG. 10

Perform at least one round trip time, RTT, measurement over a measurement time, $T_m$, the measurement time being a function of at least an association between a first periodicity, $T_{RS1}$, of a first reference signal and a second periodicity, $T_{RS2}$, of a second reference signal, the first reference signal being transmitted from the WD to a network node and the second reference signal being received by the WD from the network node
S142

Optionally, report a result of the at least one RTT measurement
S144

FIG. 11

RTT MEASUREMENT PROCEDURE BASED ON DL AND UL REFERENCE SIGNAL RELATIONS

CROSS-REFERENCE TO RELATED APPLICATIONS

This application is a Submission Under 35 U.S.C. § 371 for U.S. National Stage Patent Application of International Application No.: PCT/EP2021/053532, filed Feb. 12, 2021 entitled "RTT MEASUREMENT PROCEDURE BASED ON DL AND UL REFERENCE SIGNAL RELATIONS," which claims priority to U. S. Provisional Application No.: 62/975,910, filed Feb. 13, 2020, entitled RTT MEASUREMENT PROCEDURE BASED ON DL AND UL RS RELATIONS," the entireties of both of which are incorporated herein by reference.

TECHNICAL FIELD

The present disclosure relates to wireless communications, and in particular, to performing a round trip time (RTT) measurement between two or more nodes or devices over a measurement time.

BACKGROUND

Positioning in New Radio

New Radio (NR) (also known as "5G" or Next Generation or NG) architecture is being discussed in the 3rd Generation Partnership Project (3GPP). A NR current concept is illustrated in FIG. 1, which may include a wireless device (WD) 2, a NG Radio Access Network 4 (NG-RAN), an access and mobility management function (AMF) 8 and a location management function (LMF) 6; where the NG-RAN 4 comprises a Node1 and Node2 denoting NR base stations (BSs) (one NR BS may correspond to one or more transmission/reception points (TRPs)) and the lines between the nodes illustrate the corresponding interfaces. Node1 and Node2 may not always both be present. When both are present, the Next Generation Control Plane (NG-C) interface is only present for one of them.

A Local Management Function (LMF) is the location node in NR. There may also be interactions between the location node and the network node via the NR Positioning Protocol A (NRPPa) (not illustrated in FIG. 1) and between the wireless device (WD) and the location server via NR Long-Term Evolution Positioning Protocol (LPP). The interactions between the network node and the WD are supported via the Radio Resource Control (RRC) protocol.

In NR, several round trip time (RTT) positioning measurements are specified. Examples are the WD receive (Rx)–transmit (Tx) time difference, the network node Rx-Tx time difference, the time advance (TA), etc.

The WD Rx-Tx time difference is defined as $T_{WD-RX}-T_{WD-TX}$, where:

$T_{WD-RX}$ is the WD received timing of downlink subframe # from a positioning node, defined by the first detected path in time. $T_{WD-RX}$ is measured on positioning reference signals (PRS) signals received from the network node.

$T_{WD-TX}$ is the WD transmit timing of uplink subframe #$_j$ that is closest in time to the subframe #$_i$ received from the positioning node. $T_{WD-TX}$ is measured on sounding reference signals (SRS) transmitted by the WD.

The network node Rx-Tx time difference is defined as $T_{NN-RX}-T_{NN-TX}$, where:

$T_{NN-RX}$ is the positioning node received timing of uplink subframe #+ containing SRS associated with WD, defined by the first detected path in time. $T_{NN-RX}$ is measured on SRS signals received from the WD.

$T_{NN-TX}$ is the positioning node transmit timing of downlink subframe #$_j$ that is closest in time to the subframe #$_i$ received from the WD. $T_{NN-TX}$ is measured on PRS signals transmitted by the network node.

Reference signals may be used for NR RTT positioning measurements. Positioning reference signals (PRS) may be periodically transmitted on a positioning frequency layer in PRS resources in the downlink (DL) by the network node. The information about the PRS resources is signaled to the WD by the positioning node via higher layers but may also be provided by a network node such as a base station, e.g., via broadcast. Each positioning frequency layer comprises PRS resource sets, where each PRS resource set comprises one or more PRS resources. All the DL PRS resources within one PRS resource set are configured with the same periodicity.

The PRS resource periodicity $$\left(T_{per}^{PRS}\right)$$

comprises.

$$T_{per}^{PRS} \in 2^{\mu}\{4, 8, 16, 32, 64, 5, 10, 20, 40,$$
$$80, 160, 320, 640, 1280, 2560, 5120, 10240, 20480\}\ slots,$$

where μ=0, 1, 2, 3 for PRS Subcarrier Spacing (SCS) of 15, 30, 60 and 120 kHz respectively.

$$T_{per}^{PRS} = 2^{\mu} \cdot 20480$$

is not supported for μ=0.

Each PRS resource can also be repeated within one PRS resource set and takes values $$T_{per}^{PRS} \in \{1, 2, 4, 6, 8, 16, 32\}.$$

PRS are transmitted in a consecutive number of symbols (LPRS) within a slot: $L_{PRS} \in \{2, 4, 6, 12\}$. The following DL PRS Resource Element (RE) patterns, with comb size $K_{PRS}$ equal to number of symbols $L_{PRS}$ are supported:

Comb-2: Symbols {0, 1} have relative RE offsets {0, 1};

Comb-4: Symbols {0, 1, 2, 3} have relative RE offsets {0, 2, 1, 3}; and.

Comb-6: Symbols {0, 1, 2, 3, 4, 5} have relative RE offsets {0, 3, 1, 4, 2, 5}.

Maximum PRS bandwidth (BW) is 272 Physical Resource Blocks (PRBs). Minimum PRS BW is 24 PRBs. The configured PRS BW may be a multiple of 4.

Sounding reference signals are also for positioning. For positioning measurement, the WD can be configured (typically by the serving base station) with SRS resource for SRS transmission in $N_S \in \{1, 2, 4, 8, 12\}$ number of adjacent symbols anywhere within the slot. The periodic SRS resource can be configured with a periodicity ($T_{SRS}$):

$$T_{SRS} \in \{1, 2, 4, 5, 8, 10, 16, 20, 32, 40, 64, 80, 160, 320, 640, 1280, 2560\} \text{ slots.}$$

In the existing systems (e.g., in 3GPP Long-Term Evolution (LTE) positioning), the bidirectional measurements (e.g., WD Rx-Tx) are performed on Cell Specific Reference Signals (CRS) and SRS and always with respect to the serving cell. In LTE, the CRS are transmitted by the base station in every subframe, while the SRS can be configured with different periodicities. In order to achieve sufficient WD Rx-Tx measurement accuracy, the WD obtains and combines several samples of RX–TX time differences over a certain layer-1 measurement period (TO). In existing solutions like in LTE due to the frequently available CRS, the WD has a lot of freedom in terms of obtaining samples for the RTT measurement. However, in NR both CRS and SRS can be configured with different periodicities. The PRS periodicity can vary over an especially large range. This leads to additional complexity in the WD to accurately measure the RTT measurement. As a result, the WD may have to store the RX and/or TX measurement samples for a very long time before deriving the RX-TX time difference, draining its memory and increasing processing but also impacting the positioning accuracy in the end.

SUMMARY

Some embodiments advantageously provide methods, systems, and apparatuses for performing a more accurate round trip time measurement between two or more nodes or devices over a measurement time.

According to one embodiment, a first node (Node1) performs an RTT measurement (e.g. WD RX–TX time difference measurement) on, a first reference signal (RS1) transmitted to a second node (Node2) and a second reference signal (RS2) received from Node2, over a measurement time (Tm), which is function of at least an association between periodicities of RS1 and RS2. Transmitting RS1 to Node2 may further comprise any one or more of transmitting RS1 which is known (e.g., some or all parameters of its sequence, its time resources, etc.) to Node2 and to be received at Node2, transmitting RS1 in the direction of Node2, transmitting Node2-specific RS1, transmitting RS1 which is not Node2-specific, transmitting RS1 based on a timing advance with respect to Node2, and transmitting RS1 based on a timing advance with respect to a node other than Node2 (e.g., uplink (UL) transmission is based on serving cell timing advance (TA) but to be received at a non-serving cell Node2), etc. An example of the association function comprises a maximum of the periodicities of RS1 and RS2. The embodiment may include additional aspects as further described herein.

According to another aspect of this embodiment, Node1 performs an RTT measurement on, RS1 transmitted to Node2 and RS2 received from Node2, over Tm, which may be a function of at least an association between periodicities of RS1, RS2 and any measurement gaps (if used).

According to yet another aspect of this embodiment, Node1 performs an RTT measurement on, RS1 transmitted to Node2 and RS2 received from Node2, over Tm, which is function of at least an association between periodicities of RS1, RS2 and WD activity level. Examples of WD activity levels are Discontinuous Reception (DRX), extended DRX (eDRX), a resource pattern for monitoring a serving cell (e.g. control channel monitoring pattern), etc. In one example, this rule may apply based on a relation between a DRX cycle and periodicities of RS1 and RS2, e.g. applies only when DRX cycle is not larger than RS1 and/or RS2 periodicities by a certain margin.

According to another embodiment, Node1 is configured to perform the RTT measurement over Tm on multiple nodes in a multi-RTT measurement scenario. In this case, the multi-RTT measurement time may be a function of at least an association between a set $S1=\{T_{RS11}, T_{RS12}, \ldots, T_{RS1k}\}$ comprising periodicities of RSs transmitted by Node1 towards Node2s and a set $S2=\{T_{RS21}, T_{RS22}, \ldots, T_{RS2k}\}$ comprising periodicities of RSs transmitted by Node2s towards Node1. The embodiment may comprise additional aspects as further described herein.

In one aspect, Node1 and Node2 are a WD and a network node (e.g., serving or non-serving BS, TRP, network node, location measurement unit (LMU) etc.) respectively, in which case the RTT measurement is performed by the WD. In such an embodiment, an example of RS1 is SRS or Random Access Channel (RACH), and example of RS2 is PRS.

In another example, Node1 and Node2 are a network node (e.g. serving or non-serving BS, TRP, network node, LMU etc.) and WD respectively, in which case the RTT measurement is performed by the BS. In such an embodiment, an example of RS1 is PRS, and an example of RS2 is SRS or Physical Random Access Channel (PRACH).

In yet another example, both Node1 and Node2 are WDs (WD1 and WD2 respectively), in which case the RTT measurement is performed by WD1 on signals operating between WD1 and WD2. In such an embodiment, one example of RS1 and RS2 are SRS1 and SRS2 respectively, other examples are sidelink reference signals or channels.

According to yet another aspect of the present disclosure, a method implemented in a wireless device, WD, is provided. The method includes performing at least one round trip time, RTT, measurement over a measurement time, $T_m$, the measurement time being a function of at least an association between a first periodicity, $T_{RS1}$, of a first reference signal and a second periodicity, $T_{RS2}$, of a second reference signal, the first reference signal being transmitted from the WD to a network node and the second reference signal being received by the WD from the network node. The method includes optionally, using a result of the at least one RTT measurement for one or more operational tasks.

In some embodiments, the first reference signal is a sounding reference signal, SRS, and the second reference signal is a positioning reference signal, PRS; and the first periodicity is a periodicity of the SRS and the second periodicity is a periodicity of the PRS. In some embodiments, the association between the first periodicity and the second periodicity comprises at least one relation associated with the first periodicity and the second periodicity. In some embodiments, the at least one relation includes at least one of: a maximum of the first periodicity and the second periodicity: a minimum of the first periodicity and the second periodicity; and a difference between the first periodicity and the second periodicity. In some embodiments, the at least one relation includes at least one of: a mean of at least the first periodicity and the second periodicity: a least common multiple of at least the first periodicity and the second periodicity; and a modulus operation comprising the first periodicity and the second periodicity.

In some embodiments, the at least one relation depends on a condition. In some embodiments, a first relation is used when the condition is met: otherwise, a second relation is used. In some embodiments, the condition is that mod(max $(T_{RS1}, T_{RS2})$/min($T_{RS1}, T_{RS2}$)) exceeds a threshold value. In some embodiments, the condition is based further on a third relation, the first relation being used when the threshold value is exceeded by the third relation; otherwise, the second relation is used. In some embodiments, the measurement time is the function of the association between the first periodicity and the second periodicity when a condition is met: otherwise, the measurement time is not a function of the association.

In some embodiments, the condition comprises a configured value, the measurement time is the function of the association when the configured value is met: otherwise, the measurement time is not a function of the association. In some embodiments, the condition comprises a threshold value, the measurement time is the function of the association when the threshold value is exceeded: otherwise, the measurement time is not a function of the association. In some embodiments, the measurement time is further the function of at least one of a minimum duration for the measurement time and a scaling factor. In some embodiments, the measurement time is a maximum of the association and the at least one of the minimum duration for the measurement time and the scaling factor.

In some embodiments, the measurement time is further the function of at least one of: a periodicity associated with an activity level of the WD, a measurement gap and a measurement gap periodicity. In some embodiments, performing the at least one RTT measurement further comprises performing multiple RTT measurements associated with multiple different nodes.

The one or more operational tasks may comprise one or more of: reporting the results of the at least one RTT measurement to a network node, using the results of the at least one RTT measurement for positioning of the WD and using the results of the at least one RTT measurement for collecting performance statistics.

According to an aspect of the present disclosure, a method implemented in a network node is provided. The method includes performing at least one round trip time, RTT, measurement over a measurement time, the measurement time being a function of at least an association between a first periodicity of a first reference signal and a second periodicity of a second reference signal, the first reference signal being received by the network node from a wireless device, WD, and the second reference signal being transmitted from the network node to the WD. The method includes optionally, using the at least one RTT measurement for an operational task.

In some embodiments, the first reference signal is a sounding reference signal, SRS, and the second reference signal is a positioning reference signal, PRS; and the first periodicity is a periodicity of the SRS and the second periodicity is a periodicity of the PRS. In some embodiments, the association between the first periodicity and the second periodicity comprises at least one relation associated with the first periodicity and the second periodicity. In some embodiments, the at least one relation includes at least one of: a maximum of the first periodicity and the second periodicity: a minimum of the first periodicity and the second periodicity; and a difference between the first periodicity and the second periodicity. In some embodiments, the at least one relation includes at least one of: a mean of at least the first periodicity and the second periodicity: a least common multiple of at least the first periodicity and the second periodicity; and a modulus operation comprising the first periodicity and the second periodicity.

In some embodiments, the at least one relation depends on a condition. In some embodiments, a first relation is used when the condition is met: otherwise, a second relation is used. In some embodiments, the condition is that mod(max ($T_{RS1}$, $T_{RS2}$)/min($T_{RS1}$, $T_{RS2}$)) exceeds a threshold value. In some embodiments, the condition is based further on a third relation, the first relation being used when the threshold value is exceeded by the third relation: otherwise, the second relation is used. In some embodiments, the measurement time is the function of the association between the first periodicity and the second periodicity when a condition is met: otherwise, the measurement time is not a function of the association.

In some embodiments, the condition comprises a configured value, the measurement time is the function of the association when the configured value is met: otherwise, the measurement time is not a function of the association. In some embodiments, the condition comprises a threshold value, the measurement time is the function of the association when the threshold value is exceeded; otherwise, the measurement time is not a function of the association. In some embodiments, the measurement time is further the function of at least one of a minimum duration for the measurement time and a scaling factor. In some embodiments, the measurement time is a maximum of the association and the at least one of the minimum duration for the measurement time and the scaling factor. In some embodiments, performing the at least one RTT measurement further comprises performing multiple RTT measurements associated with multiple different nodes.

The one or more operational tasks may comprise one or more of: reporting the results of the at least one RTT measurement to another network node, using the results of the at least one RTT measurement for positioning of the WD and using the results of the at least one RTT measurement for collecting performance statistics.

According to an aspect of the present disclosure, a wireless device, WD, configured to communicate with a network node is provided. The WD comprises processing circuitry, the processing circuitry configured to cause the WD to perform at least one round trip time, RTT, measurement over a measurement time, $T_m$, the measurement time being a function of at least an association between a first periodicity, $T_{RS1}$, of a first reference signal and a second periodicity. $T_{RS2}$, of a second reference signal, the first reference signal being transmitted from the WD to a network node and the second reference signal being received by the WD from the network node; and use a result of the at least one RTT measurement for one or more operational tasks.

In some embodiments, the first reference signal is a sounding reference signal, SRS, and the second reference signal is a positioning reference signal, PRS; and the first periodicity is a periodicity of the SRS and the second periodicity is a periodicity of the PRS. In some embodiments, the association between the first periodicity and the second periodicity comprises at least one relation associated with the first periodicity and the second periodicity. In some embodiments, the at least one relation includes at least one of: a maximum of the first periodicity and the second periodicity: a minimum of the first periodicity and the second periodicity; and a difference between the first periodicity and the second periodicity. In some embodiments, the at least one relation includes at least one of: a mean of at least the first periodicity and the second periodicity: a least common multiple of at least the first periodicity and the second periodicity; and a modulus operation comprising the first periodicity and the second periodicity.

In some embodiments, the at least one relation depends on a condition. In some embodiments, a first relation is used when the condition is met: otherwise, a second relation is used. In some embodiments, the condition is that mod(max $(T_{RS1}, T_{RS2})/\min(T_{RS1}, T_{RS2}))$ exceeds a threshold value. In some embodiments, the condition is based further on a third relation, the first relation being used when the threshold value is exceeded by the third relation; otherwise, the second relation is used. In some embodiments, the measurement time is the function of the association between the first periodicity and the second periodicity when a condition is met: otherwise, the measurement time is not a function of the association.

In some embodiments, the condition comprises a configured value, the measurement time is the function of the association when the configured value is met: otherwise, the measurement time is not a function of the association. In some embodiments, the condition comprises a threshold value, the measurement time is the function of the association when the threshold value is exceeded: otherwise, the measurement time is not a function of the association. In some embodiments, the measurement time is further the function of at least one of a minimum duration for the measurement time and a scaling factor. In some embodiments, the measurement time is a maximum of the association and the at least one of the minimum duration for the measurement time and the scaling factor.

In some embodiments, the measurement time is further the function of at least one of: a periodicity associated with an activity level of the WD, a measurement gap and a measurement gap periodicity. In some embodiments, the processing circuitry is configured to cause the WD to perform the at least one RTT measurement by being configured to cause the WD to perform multiple RTT measurements associated with multiple different nodes.

The one or more operational tasks may comprise one or more of: reporting the results of the at least one RTT measurement to a network node, using the results of the at least one RTT measurement for positioning of the WD and using the results of the at least one RTT measurement for collecting performance statistics.

According to an aspect of the present disclosure, a network node configured to communicate with a wireless device, WD, is provided. The network node comprises processing circuitry. The processing circuitry is configured to cause the network node to perform at least one round trip time, RTT, measurement over a measurement time, the measurement time being a function of at least an association between a first periodicity of a first reference signal and a second periodicity of a second reference signal, the first reference signal being received by the network node from a wireless device, WD, and the second reference signal being transmitted from the network node to the WD; and use the at least one RTT measurement for an operational task.

In some embodiments, the first reference signal is a sounding reference signal, SRS, and the second reference signal is a positioning reference signal, PRS; and the first periodicity is a periodicity of the SRS and the second periodicity is a periodicity of the PRS. In some embodiments, the association between the first periodicity and the second periodicity comprises at least one relation associated with the first periodicity and the second periodicity. In some embodiments, the at least one relation includes at least one of: a maximum of the first periodicity and the second periodicity: a minimum of the first periodicity and the second periodicity; and a difference between the first periodicity and the second periodicity. In some embodiments, the at least one relation includes at least one of: a mean of at least the first periodicity and the second periodicity: a least common multiple of at least the first periodicity and the second periodicity; and a modulus operation comprising the first periodicity and the second periodicity.

In some embodiments, the at least one relation depends on a condition. In some embodiments, a first relation is used when the condition is met: otherwise, a second relation is used. In some embodiments, the condition is that mod(max $(T_{RS1}, T_{RS2})/\min(T_{RS1}, T_{RS2}))$ exceeds a threshold value. In some embodiments, the condition is based further on a third relation, the first relation being used when the threshold value is exceeded by the third relation: otherwise, the second relation is used. In some embodiments, the measurement time is the function of the association between the first periodicity and the second periodicity when a condition is met: otherwise, the measurement time is not a function of the association. In some embodiments, the condition comprises a configured value, the measurement time is the function of the association when the configured value is met: otherwise, the measurement time is not a function of the association.

In some embodiments, the condition comprises a threshold value, the measurement time is the function of the association when the threshold value is exceeded: otherwise, the measurement time is not a function of the association. In some embodiments, the measurement time is further the function of at least one of a minimum duration for the measurement time and a scaling factor. In some embodiments, the measurement time is a maximum of the association and the at least one of the minimum duration for the measurement time and the scaling factor. In some embodiments, the processing circuitry is configured to cause the network node to perform the at least one RTT measurement by being configured to cause the network node to perform multiple RTT measurements associated with multiple different nodes. The one or more operational tasks may comprise one or more of: reporting the results of the at least one RTT measurement to another network node, using the results of the at least one RTT measurement for positioning of the WD and using the results of the at least one RTT measurement for collecting performance statistics.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for receiving user data from the wireless device at a host computer according to some embodiments of the present disclosure:

FIG. 7 is a flowchart illustrating exemplary methods implemented in a communication system including a host computer, a network node and a wireless device for receiving user data at a host computer according to some embodiments of the present disclosure:

FIG. 8 is a flowchart of an exemplary process in a network node for performing at least one round trip time measurement over a measurement time according to some embodiments of the present disclosure:

FIG. 9 is a flowchart of an exemplary process in a wireless device for performing at least one round trip time measurement over a measurement time according to some embodiments of the present disclosure:

FIG. 10 is a flowchart of another exemplary process in a network node for performing at least one round trip time measurement over a measurement time according to some embodiments of the present disclosure:

FIG. 11 is a flowchart of another exemplary process in a wireless device for performing at least one round trip time measurement over a measurement time according to some embodiments of the present disclosure:

DETAILED DESCRIPTION

Figure 1:
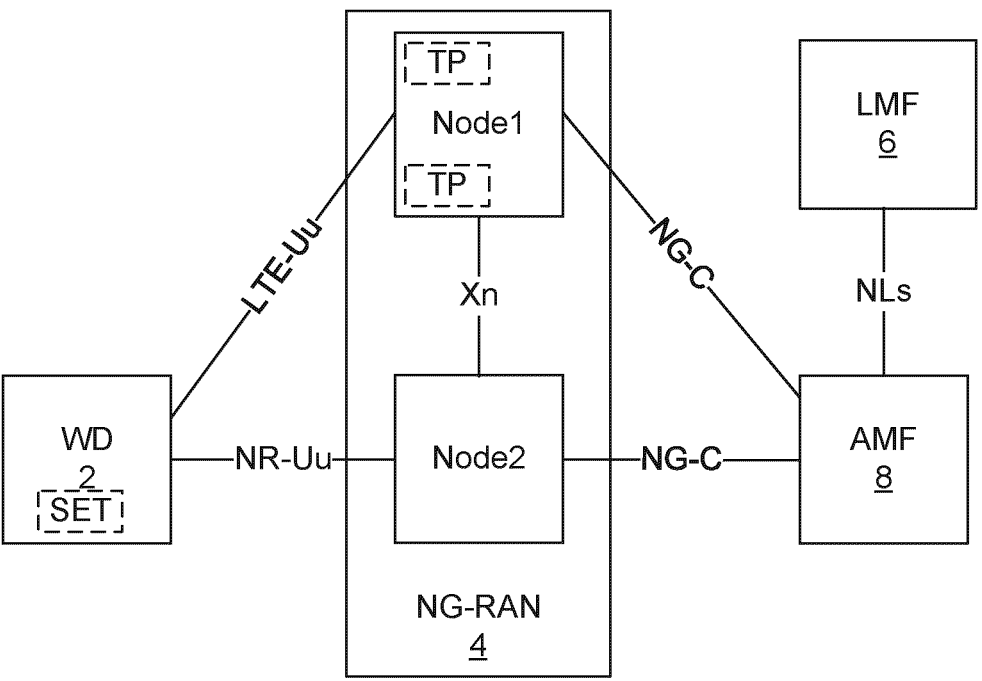
FIG. 1 is a schematic diagram of an exemplary NR network architecture.

Some embodiments described herein may enhance the performance of RTT positioning measurements regardless of the periodicities of PRS and SRS configured for the positioning measurement. The methods may further define WD behavior and provide consistent performance for RTT positioning measurements. The methods may also enable the network node (e.g. positioning node) to interpret RTT positioning measurement results reported by the WD.

Before describing in detail exemplary embodiments, it is noted that the embodiments reside primarily in combinations of apparatus components and processing steps related to performing a round trip time (RTT) measurement between two nodes or devices over a measurement time (Tm). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled." "connected," and the like, may be used herein to indicate a connection, although not necessarily directly, and may include wired and/or wireless connections.

It is noted that, in this disclosure, the general term node is used which can be a network node or a wireless device (WD).

The term radio access technology (RAT) may refer to any RAT e.g. Universal Terrestrial Radio Access (UTRA), Evolved Universal Terrestrial Radio Access (E-UTRA), narrow band internet of things (NB-IoT), WiFi, Bluetooth, next generation RAT, New Radio (NR), Fourth Generation (4G), Fifth Generation (5G), etc. Any of the equipment denoted by the term node, network node or radio network node may be capable of supporting a single or multiple RATs.

The term signal or radio signal used herein can be any physical signal or physical channel. Examples of down link (DL) physical signals are reference signal such as Primary Synchronization Signal (PSS), Secondary Synchronization Signal (SSS), Channel State Information Reference Signal (CSI-RS), DeModulation Reference Signal (DMRS), signals in Synchronization Signal Block (SSB), Downlink Reference Signal (DRS), cell specific reference signal (CRS), positioning reference signal (PRS) etc. Examples of uplink (UL) physical signals are reference signal such as Sounding Reference Signal (SRS), DMRS etc. The term physical channel refers to any channel carrying higher layer information, e.g. data, control etc. Examples of physical channels are Physical Broadcast Channel (PBCH), Narrow Band Physical Broadcast Channel (NPBCH), Physical Downlink Control Channel (PDCCH), Physical Downlink Shared Channel (PDSCH), Shortened Physical Uplink Control Channel (sPUCCH), Shortened Physical Downlink Control Channel (sPDSCH), Shortened Physical Uplink Control Channel (sPUCCH), Shortened Physical Uplink Shared Channel (sPUSCH), MTC Physical Downlink Control Channel (MPDCCH), Narrow Band Physical Downlink Control Channel (NPDCCH), Narrow Band Physical Downlink Shared Channel (NPDSCH), Enhanced Physical Downlink Control Channel (E-PDCCH), Physical Uplink Shared Channel (PUSCH), Physical Uplink Control Channel (PUCCH), Narrow Band Physical Uplink Shared Channel (NPUSCH) etc.

The term time resource used herein may correspond to any type of physical resource or radio resource expressed in terms of length of time. Examples of time resources are symbol, time slot, subframe, radio frame, TTI, interleaving time, slot, sub-slot, mini-slot, etc.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrow band IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for more accurate round trip time (RTT) measurements between two nodes or devices over a measurement time (Tm).

Figure 2:
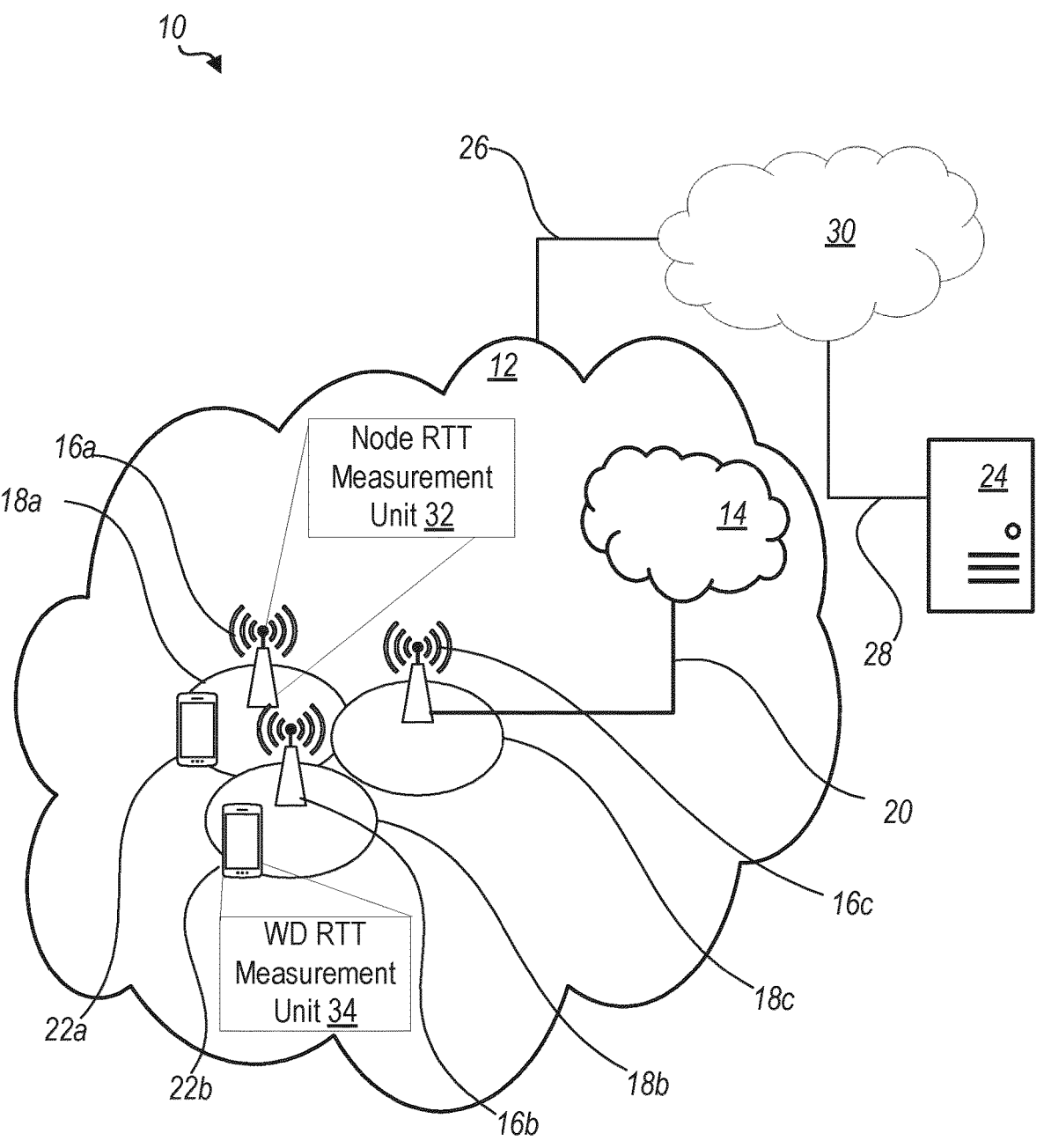
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a. 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a. 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a Node RTT Measurement Unit 32 which is configured to perform at least one round trip time measurement over $T_m$ wherein the RTT measurement is a function of at least an association between a periodicity ($T_{RS1}$) of a first reference signal (RS1) transmitted from the network node to the WD and a periodicity ($T_{RS2}$) of a second reference signal (RS2) transmitted from the WD to the node. In some embodiments, network node 16 is configured to include a Node RTT Measurement Unit 32 which is configured to perform at least one round trip time, RTT, measurement over a measurement time, the measurement time being a function of at least an association between a first periodicity of a first reference signal and a second periodicity of a second reference signal, the first reference signal being received by the network node from a wireless device, WD, and the second reference signal being transmitted from the network node to the WD; and optionally, use the at least one RTT measurement for an operational task.

A wireless device 22 may be configured to include a WD RTT Measurement Unit 34 which is configured to perform at least one RTT measurement over $T_m$, the at least one RTT measurement being a function of at least an association between $T_{RS1}$ of RS1 transmitted from the WD to the at least one of a network node and a second WD and $T_{RS2}$ of RS2 transmitted from the at least one of a network node and a second WD to the WD.

In some embodiments, wireless device 22 may be configured to include a WD RTT Measurement Unit 34 which is configured to perform at least one round trip time, RTT, measurement over a measurement time, $T_m$, the measurement time being a function of at least an association between a first periodicity, $T_{RS1}$, of a first reference signal and a second periodicity, $T_{RS2}$, of a second reference signal, the first reference signal being transmitted from the WD to a network node and the second reference signal being received by the WD from the network node; and optionally, report a result of the at least one RTT measurement.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include Node RTT Measurement Unit 32 configured to perform at least one round trip time measurement over Tm wherein the RTT measurement is a function of at least an association between a periodicity ($T_{RS1}$) of a first reference signal (RS1) transmitted from the network node to the WD and a periodicity ($T_{RS2}$) of a second reference signal (RS2) transmitted from the WD to the node.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a WD RTT Measurement Unit 34 configured to perform at least one RTT measurement over Tm, the at least one RTT measurement being a function of at least an association between $T_{RS1}$ of RS1 transmitted from the WD to the at least one of a network node and a second WD and $T_{RS2}$ of RS2 transmitted from the at least one of a network node and a second WD to the WD.

Figure 3:
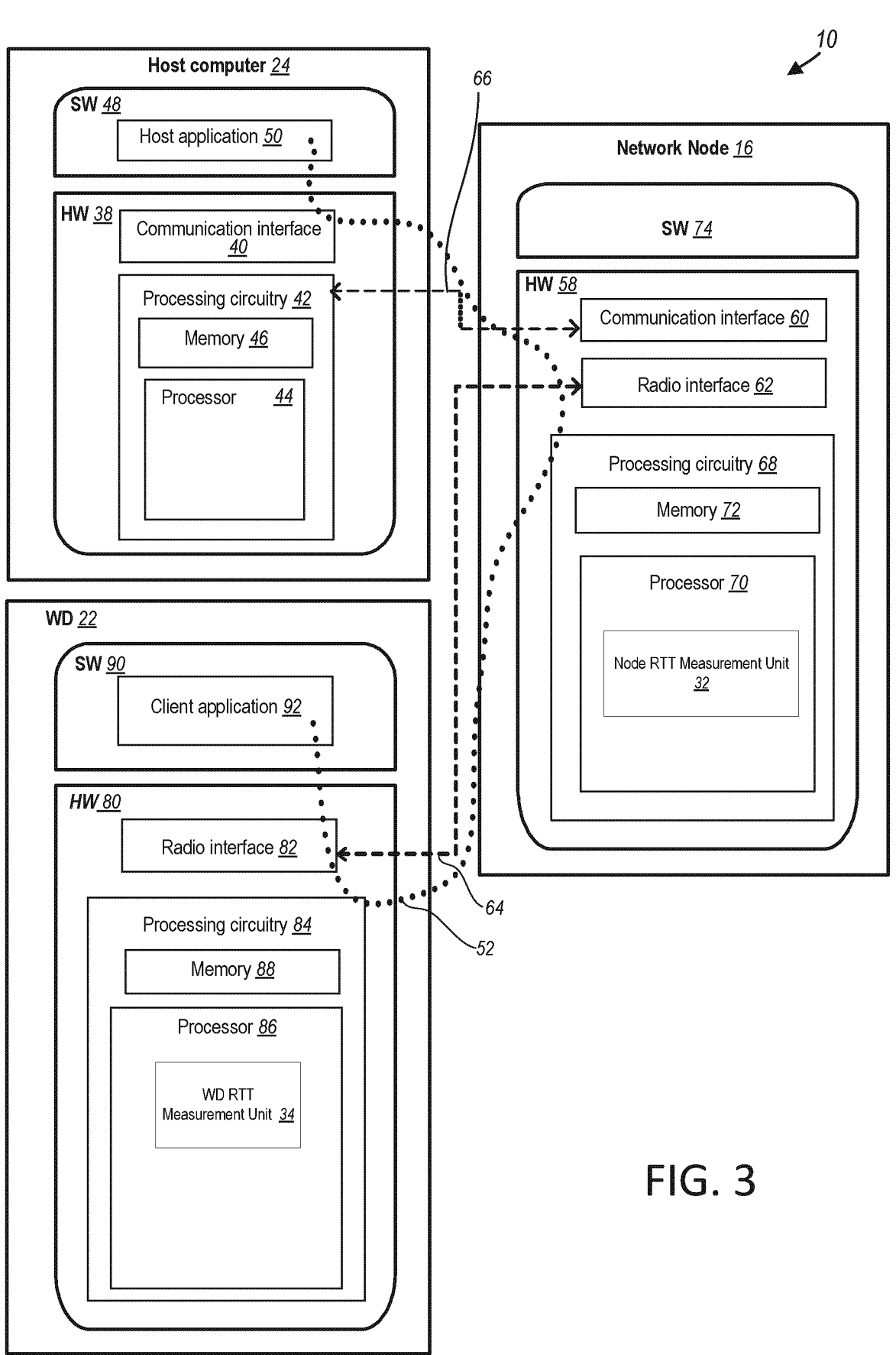
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes: the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.: the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as Node RTT Measurement Unit 32, and WD RTT Measurement Unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
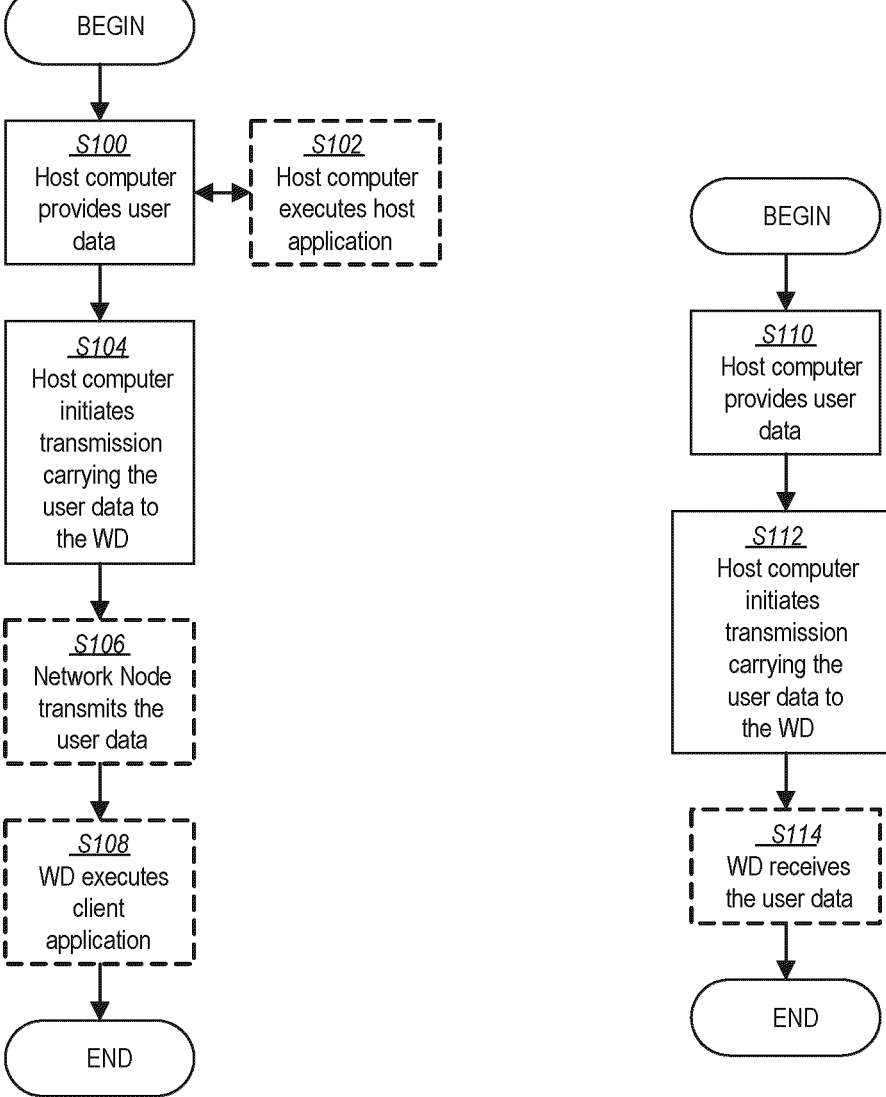
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 8 is a flowchart of an exemplary process in a network node 16 for performing at least one round trip time (RTT) measurement over a measurement time ($T_m$) according to some embodiments of the present disclosure. One or more Blocks and/or functions performed by network node 16 may be performed by one or more elements of network node 16 such as by Node RTT Measurement Unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to perform (Block S134) at least one RTT measurement over T$_m$, the RTT measurement being a function of at least an association between a periodicity (T$_{RS1}$) of a first reference signal (RS1) transmitted from the network node to at least one of a second network node and a wireless device (WD) and a periodicity (T$_{RS2}$) of a second reference signal (RS2) transmitted from the at least one of a second network node and a WD.

In one or more embodiments, RS1 further comprises a sounding reference signal (SRS) and RS2 further comprises a positioning reference signal (PRS).

In one or more embodiments, RS1 further comprises a positioning reference signal (PRS) and the RS2 further comprises a sounding reference signal (SRS).

In one or more embodiments, Tm is further a function of at least one of the periodicity of a WD's activity level and a measurement gap.

In one or more embodiments, RS1 is specific to a WD.

In one or more embodiments, network node 16 such as via one or more of processing circuitry 68, processor 70, radio interface 62 and communication interface 60 is configured to transmit RS1 based on a timing advance with respect to the at least one of a second network node and a WD.

In one or more embodiments, network node 16 such as via one or more of processing circuitry 68, processor 70, radio interface 62 and communication interface 60 is configured to perform an RTT measurement over Tm between the network node and a plurality of other nodes.

In one or more embodiments, network node 16 such as via one or more of processing circuitry 68, processor 70, radio interface 62 and communication interface 60 is configured to perform multiple RTT measurements between the network node and the plurality of other nodes without any measurement gaps between the RTT measurements, performing multiple RTT measurements between the network node and the plurality of other nodes with measurement gaps between the RTT measurements and configuring a WD activity level when performing the multiple RTT measurements.

FIG. 9 is a flowchart of an exemplary process in a wireless device 22 for performing at least one round trip time measurement over a measurement time according to some embodiments of the present disclosure. One or more Blocks and/or functions performed by wireless device 22 may be performed by one or more elements of wireless device 22 such as by WD RTT Measurement Unit 34 in processing circuitry 84, processor 86, radio interface 82, etc. In one or more embodiments, wireless device 22 such as via one or more of processing circuitry 84, processor 86 and radio interface 82 is configured to perform (Block S136) at least one RTT measurement over Tm, the RTT measurement being a function of at least an association between a periodicity (T$_{RS1}$) of a first reference signal (RS1) transmitted from the network node to at least one of a second network node and a wireless device (WD) and a periodicity (T$_{RS2}$) of a second reference signal (RS2) transmitted from the at least one of a second network node and a WD to the network node.

In one or more embodiments, RS1 further comprises a sounding reference signal (SRS) and RS2 further comprises a positioning reference signal (PRS). In one or more embodiments, RS1 further comprises a positioning reference signal (PRS) and the RS2 further comprises a sounding reference signal (SRS). In one or more embodiments, Tm is further a function of at least one of the periodicity of a WD's activity level and a measurement gap. In one or more embodiments, RS1 is specific to a WD. In one or more embodiments, WD 22 such as via one or more of processing circuitry 84, processor 86 and radio interface 82 is configured to transmit RS1 based on a timing advance with respect to the at least one of a second network node and a WD.

In one or more embodiments, WD 22 such as via one or more of processing circuitry 84, processor 86 and radio interface 82 is configured to perform an RTT measurement over Tm between the network node and a plurality of other nodes.

In one or more embodiments, WD 22 such as via one or more of processing circuitry 84, processor 86 and radio interface 82 is configured to one or more of perform multiple RTT measurements between the network node and the plurality of other nodes without any measurement gaps between the RTT measurements, perform multiple RTT measurements between the network node and the plurality of other nodes with measurement gaps between the RTT measurements and configure a WD activity level when performing the multiple RTT measurements.

FIG. 10 is a flowchart of an exemplary process in a network node 16 for performing at least one round trip time (RTT) measurement over a measurement time (Tm) according to some embodiments of the present disclosure. One or more Blocks and/or functions performed by network node 16 may be performed by one or more elements of network node 16 such as by Node RTT Measurement Unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to: perform (Block S138) at least one round trip time, RTT, measurement over a measurement time, the measurement time being a function of at least an association between a first periodicity of a first reference signal and a second periodicity of a second reference signal, the first reference signal being received by the network node from a wireless device, WD, and the second reference signal being transmitted from the network node to the WD; and optionally, use (Block S140) the at least one RTT measurement for an operational task.

In some embodiments, the first reference signal is a sounding reference signal, SRS, and the second reference signal is a positioning reference signal, PRS; and the first periodicity is a periodicity of the SRS and the second periodicity is a periodicity of the PRS. In some embodiments, the association between the first periodicity and the second periodicity comprises at least one relation associated with the first periodicity and the second periodicity. In some embodiments, the at least one relation includes at least one of: a maximum of the first periodicity and the second periodicity: a minimum of the first periodicity and the second periodicity; and a difference between the first periodicity and the second periodicity.

In some embodiments, the at least one relation includes at least one of: a mean of at least the first periodicity and the second periodicity: a least common multiple of at least the first periodicity and the second periodicity; and a modulus operation comprising the first periodicity and the second periodicity. In some embodiments, the at least one relation depends on a condition. In some embodiments, a first relation is used when the condition is met: otherwise, a second relation is used. In some embodiments, the condition is based at least in part on a threshold value, the first relation being used when the threshold value is exceeded: otherwise, the second relation is used. In some embodiments, the condition is based further on a third relation, the first relation being used when the threshold value is exceeded by the third relation: otherwise, the second relation is used.

In some embodiments, the measurement time is the function of the association between the first periodicity and the second periodicity when a condition is met: otherwise, the measurement time is not a function of the association. In some embodiments, the condition comprises a configured value, the measurement time is the function of the association when the configured value is met: otherwise, the measurement time is not a function of the association. In some embodiments, the condition comprises a threshold value, the measurement time is the function of the association when the threshold value is exceeded; otherwise, the measurement time is not a function of the association. In some embodiments, the measurement time is further the function of at least one of a minimum duration for the measurement time and a scaling factor.

In some embodiments, the measurement time is a maximum of the association and the at least one of the minimum duration for the measurement time and the scaling factor. In some embodiments, performing the at least one RTT measurement further comprises performing, such as via one or more of processing circuitry 68, processor 70, radio interface 62 and communication interface 60, multiple RTT measurements associated with multiple different nodes.

FIG. 11 is a flowchart of an exemplary process in a wireless device 22 for performing at least one round trip time measurement over a measurement time according to some embodiments of the present disclosure. One or more Blocks and/or functions performed by wireless device 22 may be performed by one or more elements of wireless device 22 such as by WD RTT Measurement Unit 34 in processing circuitry 84, processor 86, radio interface 82, etc. In one or more embodiments, wireless device 22 such as via one or more of processing circuitry 84, processor 86 and radio interface 82 is configured to perform (Block S142) at least one round trip time, RTT, measurement over a measurement time, $T_m$, the measurement time being a function of at least an association between a first periodicity, $T_{RS1}$, of a first reference signal and a second periodicity, $T_{RS2}$, of a second reference signal, the first reference signal being transmitted from the WD to a network node and the second reference signal being received by the WD from the network node. Next, the WD uses the at least one RTT measurement for one or more operational tasks, which in this example is reporting a result of the at least one RTT measurement (Block S144).

In some embodiments, the first reference signal is a sounding reference signal, SRS, and the second reference signal is a positioning reference signal, PRS; and the first periodicity is a periodicity of the SRS and the second periodicity is a periodicity of the PRS. In some embodiments, the association between the first periodicity and the second periodicity comprises at least one relation associated with the first periodicity and the second periodicity. In some embodiments, the at least one relation includes at least one of: a maximum of the first periodicity and the second periodicity: a minimum of the first periodicity and the second periodicity; and a difference between the first periodicity and the second periodicity. In some embodiments, the at least one relation includes at least one of: a mean of at least the first periodicity and the second periodicity: a least common multiple of at least the first periodicity and the second periodicity; and a modulus operation comprising the first periodicity and the second periodicity.

In some embodiments, the at least one relation depends on a condition. In some embodiments, a first relation is used when the condition is met: otherwise, a second relation is used. In some embodiments, the condition is based at least in part on a threshold value, the first relation being used when the threshold value is exceeded: otherwise, the second relation is used. In some embodiments, the condition is based further on a third relation, the first relation being used when the threshold value is exceeded by the third relation: otherwise, the second relation is used. In some embodiments, the measurement time is the function of the association between the first periodicity and the second periodicity when a condition is met; otherwise, the measurement time is not a function of the association. In some embodiments, the condition comprises a configured value, the measurement time is the function of the association when the configured value is met: otherwise, the measurement time is not a function of the association.

In some embodiments, the condition comprises a threshold value, the measurement time is the function of the association when the threshold value is exceeded: otherwise, the measurement time is not a function of the association. In some embodiments, the measurement time is further the function of at least one of a minimum duration for the measurement time and a scaling factor. In some embodiments, the measurement time is a maximum of the association and the at least one of the minimum duration for the measurement time and the scaling factor. In some embodiments, the measurement time is further the function of at least one of: a periodicity associated with an activity level of the WD, a measurement gap and a measurement gap periodicity. In some embodiments, performing the at least one RTT measurement further comprises performing, such as via one or more of processing circuitry 84, processor 86 and radio interface 82, multiple RTT measurements associated with multiple different nodes.

Having described the general process flow of arrangements of the disclosure and having provided examples of hardware and software arrangements for implementing the processes and functions of the disclosure, the sections below provide details and examples of arrangements for performing a round trip time measurement between two or more nodes or devices over a measurement time.

Some embodiments may provide for more accurate RTT measurements between two nodes or devices over Tm as compared with known arrangements.

In some embodiments, a round trip time (RTT) measurement performed by a first node (Node1) is a relation between two timing measurement components, a first component comprising measuring reception timing ($T_{RX}$) of a signal received by Node1 from a second node (Node2) and a second component comprising measuring transmission timing ($T_{TX}$) of a signal transmitted by Node1. In some embodiments, either Node1 or Node2 may be network node 16. An example of the relation is the difference between $T_{RX}$ and $T_{TX}$ (e.g. $T_{RX}$–$T_{TX}$). RTT is also called as a bidirectional timing measurement. Examples of RTT measurements are WD RX–TX time difference measurements, network node or gNB RX–TX time difference measurements, timing advances, propagation delays etc.

The term multi-round trip (multi-RTT) measurement used herein corresponds to any WD 22 measurement comprising at least one RTT measurement on signals of one serving cell or TRP (e.g. PCell, PSCell, etc.) and at least one RTT measurement on signals of another cell or TRP (e.g. a neighbor cell, another serving cell etc.). Examples of multi-RTT measurement are multi-RTT positioning measurements such as multiple WD RX-TX time difference measurements involving two or more cells, timing advance, combination of or difference between two RTT measurements, etc.

One scenario involves at least one first node (Node1) and at least one second node (Node2). In some embodiments, either Node1 or Node2 may be network node 16. Node1 is configured by a third node (Node3) to perform RTT measurement on signals operating between Node1 and Node2. The term operating a signal between nodes refers to one node transmitting the signal to another node and/or one node receiving the signal from another node. Examples of signals are reference signals, pilot signals etc. Node1 may be configured to transmit at least a first reference (RS1). Node2 may be configured to transmit at least a second reference (RS2). At least one of Node1 and Node2 may further be configured with low activity level, e.g., with DRX, DTX, and/or control channel monitoring pattern.

Node1 and Node2 can have different characteristics in different RTT measurement scenarios.

For example, in a first exemplary scenario, Node1 and Node2 are WD 22 and network node 16, respectively. In this case, the RTT measurement is performed by WD 22 on reference signals operating between WD 22 and network node 16. In one example, RS1 and RS2 are SRS and PRS respectively. This scenario is illustrated in FIG. 12, scenario (A).

In a second exemplary scenario, Node1 and Node2 are network nodes (NNs) 16 and WD 22, respectively. In this case, the RTT measurement is performed by network node 16 on reference signals operating between WD 22 and network node 16. In one example RS1 and RS2 are PRS and SRS, respectively. This scenario is illustrated in FIG. 12, scenario (B).

In a third exemplary scenario, Node1 and Node2 are WD 22a and WD 22b, respectively, and are capable of, i.e., configured to support, D2D operation (e.g. V2X, Prose etc.). In this case, the RTT measurement is performed by WD 22a on signals operating 0 between WD 22a and WD 22b. In one example, RS1 and RS2 are SRS and SRS, respectively. In another example RS1 and RS2 are SRS and PRS, respectively. This scenario is illustrated in FIG. 12, scenario (C).

Figure 12:
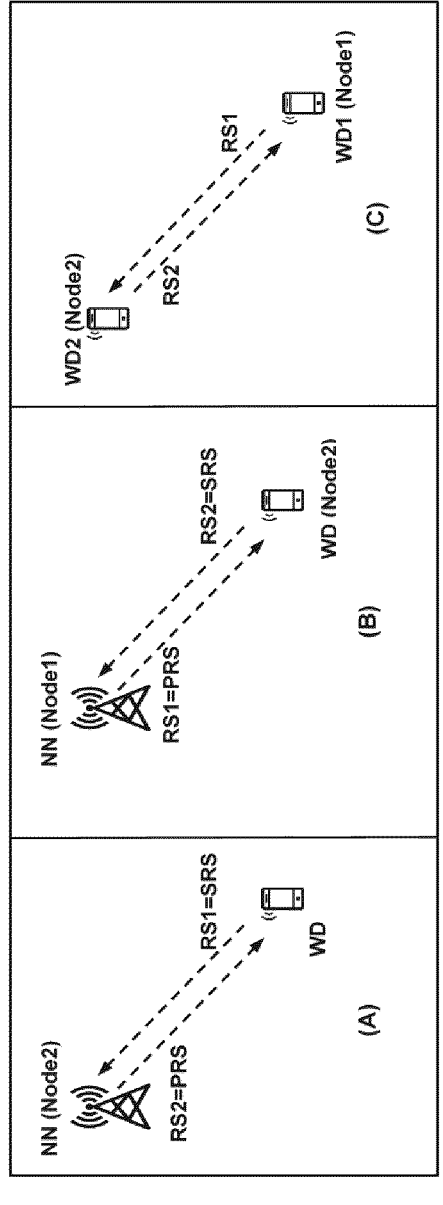
FIG. 12 illustrates example scenarios of a network node performing a round trip time measurement according to at least one embodiment of the present disclosure.

FIG. 12 illustrates examples of Node1 performing an RTT measurement. In FIG. 10, scenario (A) Node1 is WD 22, Node2 is network node 16, RS1 is SRS and RS2 is PRS. In FIG. 10, scenario (B), Node1 is network node 16, Node2 is WD 22, RS1 is PRS and RS2 is SRS. In FIG. 10, scenario (C), Node1 is WD 22a, Node2 is WD 22b, RS1 and RS2 can be any RS transmitted by WD22a and WD22b respectively, e.g. RS1 and RS2 are both SRS.

Node1 may also be configured to perform multi-RTT measurements on signals operating between Node1 and one or more Node2s (e.g. N21, N22, . . . , N2k). In this case, Node1 may be a WD. $RS_{1k}$ is a RS transmitted by Node1 to N2k (i.e. kth Node2). $RS_{2k}$ is a RS transmitted by Node2k to Node1. As one case, Node1 may transmit the same RS regardless of the number of Node2s, i.e. R1=$RS_{11}$= $RS_{12}$, . . . , $RS_{1k}$. This arrangement is shown in FIG. 13.

Figure 13:
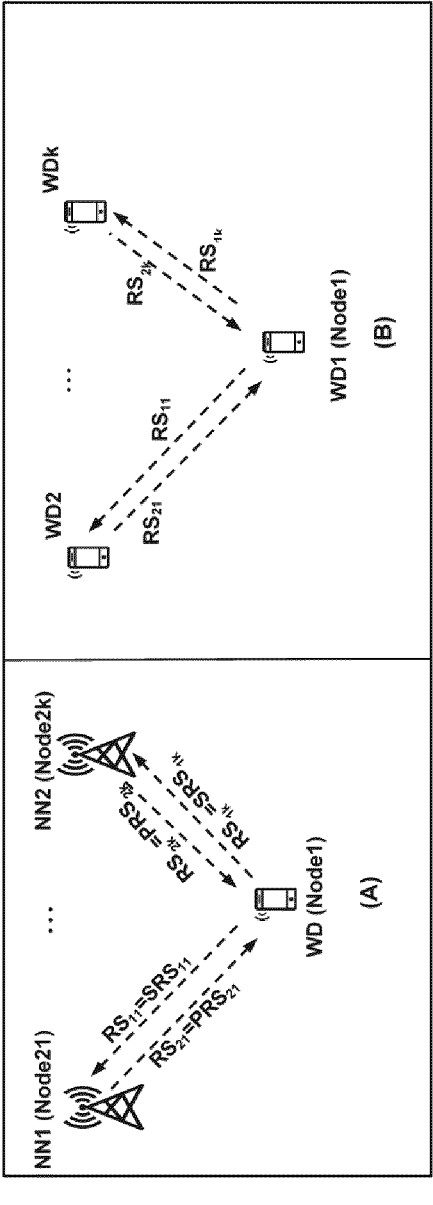
FIG. 13 illustrates example scenarios of network node performing multiple round trip time measurements according to at least one embodiment of the present disclosure.

FIGS. 13, scenario (A) and 13, scenario (B) illustrates examples of Node1 performing multi-RTT measurements. In FIG. 13, scenario (A), Node1 is WD22, Node2s are network nodes 16, $RS_{1k}$ is SRS and $RS_{2k}$ is PRS. In FIG. 13, scenario (B), Node1 is WD 22a, Node2s are WD 22bs, $RS_{1k}$ and $RS_{2k}$ can be any RS transmitted by WD 22a and WD22b respectively, e.g. $RS_{1k}$ and $RS_{2k}$ are both SRS.

Node3 may or may not be different from Node1 and Node2. Node3 can for example be a SON/O&M node, a serving or other BS or TRP, positioning node, WD 22, etc. Node3 may configure at least one of an RTT measurement to be performed by Node1, an RTT measurement to be performed by Node2, RS1 transmission and RS2 transmission.

Various embodiments are directed toward a method in network node 16 of performing an RTT measurement as function of RS1 and RS2 periods.

According to an aspect of an embodiment, network node 16 may perform at least one RTT measurement over a measurement time (Tm), which is function of at least an association between a periodicity ($T_{RS1}$) of RS1 and a periodicity ($T_{RS2}$) of RS2. This embodiment may be related to the arrangement shown in FIG. 9.

The RTT measurement performed over Tm may comprise one or more measurement samples. For example, over Tm, multiple samples can be combined by network node 16 based on a function (e.g. mean) to achieve certain RTT measurement accuracy. The measurement sample may also be interchangeably called as sample, snapshot, measured value etc. Each sample may be a function of two timing measurement components.

In some embodiments, a first component may include reception timing ($T_{RX}$) of RS2 received by Node1, e.g. network node 16, from Node2 and a second component may comprise transmission timing ($T_{TX}$) of RS1 transmitted by Node1.

In one example each sample is the difference ($\Delta T$) between $T_{RX}$ and $T_{TX}$. e.g. $\Delta T = T_{RX} - T_{TX}$.

The measurement time, Tm, can be expressed by following generic expression:

$$Tm = f1(K_{11}, K_{12}, \alpha_1(T_{RS1}, T_{RS2})) \tag{1},$$

where:

$K_{11}$ is related to a minimum duration of Tm. This is to avoid too small of a measurement time in case $T_{RS1}$ and/or $T_{RS2}$ are very small (e.g. 4 slots).

$K_{12}$ is a scaling factor. It relates to the number of RTT measurement samples used by WD 22 over Tm for performing the RTT measurement.

In one example, $T_{RS1}$ and $T_{RS2}$ correspond to PRS resource periodicity $$\left(T_{per}^{PRS}\right)$$

and SRS resource periodicity ($T_{SRS}$), respectively, e.g. when Node1 is network node 16 and Node2 is WD 22. In another example, $T_{RS1}$ and $T_{RS2}$ correspond to SRS resource periodicity ($T_{SRS}$) and PRS resource periodicity $$\left(T_{per}^{PRS}\right),$$

respectively, e.g., when Node1 is WD 22 and Node2 is network node 16. In yet another example, $T_{RS1}$ and $T_{RS2}$ correspond to SRS resource periodicity ($T_{SRS1}$) and SRS resource periodicity ($T_{SRS2}$) respectively, e.g., when Node1 is WD 22a and Node2 is WD22b capable of D2D operation.

$\alpha_1(\cdot)$ associates $T_{RS1}$ and $T_{RS2}$ based on a relation. Examples of a relation are maximum, mean, maximum/ minimum, ceil (maximum/minimum), least common multiple LCM($T_{RS1}$, $T_{RS2}$), modulus, etc., of $T_{RS1}$ and $T_{RS2}$, or any function of these functions. The relation may also depend on a condition, e.g., a first relation applies when mod(max($T_{RS1}$, $T_{RS2}$)/min($T_{RS1}$, $T_{RS2}$)) exceeds a first threshold (e.g., 0 or 0.2) otherwise a second relation applies.

One example of an expression defining Tm can be expressed as follows:

$$Tm=MAX(K_{11},K_{12}*\alpha_1(T_{RS1},T_{RS2})) \qquad (2).$$

Another example of an expression defining Tm can be expressed as follows assuming $\alpha_1(T_{RS1}, T_{RS2})$=MAX($T_{RS1}$, $T_{RS2}$):

$$Tm=MAX(K_{11},K_{12}*MAX(T_{RS1},T_{RS2})) \qquad (3).$$

Examples of $K_{11}$ and $K_{12}$ are 200 ms and 5, respectively, assuming $T_{RS1}$ and $T_{RS2}$ are also expressed in ms. In one case $K_{11}$=0 and $K_{12}$=1 (e.g. measurement is based on single sample).

According to another aspect of an embodiment, Node1, e.g. network node 16, performs an RTT measurement on, RS1 transmitted to Node2 and RS2 received from Node2, over Tm, which is function of at least an association between $T_{RS1}$, $T_{RS2}$ and a measurement gap periodicity (TG) if measurement gaps are used by network node 16 for performing the RTT measurements. The measurement gap periodicity is also interchangeably called a measurement gap repetition period (MGRP), e.g. the period with which WD 22 is required to monitor a control channel e.g. PDCCH). For example, network node 16 may have to receive signals from Node2 outside the active bandwidth part of the serving cell of network node 16, and therefore gaps are configured. An example of a measurement gap pattern comprises a periodic gap of 6 ms repeated with a periodicity of 40 ms. An example of a general expression defining Tm when gaps are used for RTT measurement can be expressed as follows:

$$Tm=f2(K_{21},K_{22},K_{23},\alpha_2(T_{RS1},T_{RS2},T_G)) \qquad (4),$$

Where:
$K_{21}$ is related to minimum duration of Tm.
$K_{22}$ is a first scaling factor. It relates to the number of RTT measurement samples used by WD 22 over Tm for performing the RTT measurement when gaps are used.
$K_{23}$ is a second scaling factor. It relates to the sharing of gaps for doing the same or different types of measurements on two or more carrier frequencies or frequency layers. $K_{23}$=1 if the all the gaps are used for the RTT measurement.
$T_G$ is the measurement gap periodicity.

Examples of $\alpha_2$ are max, mean, maximum/minimum, ceil (maximum/minimum), least common multiple e.g. LCM ($T_{RS1}$, $T_{RS2}$, $T_G$), modulus, etc., of $T_{RS1}$ and $T_{RS2}$ and $T_G$, or any function of these functions. The relation may also depend on a condition, e.g., a first relation applies when mod(max($T_{RS1}$, $T_{RS2}$)/min($T_{RS1}$, $T_{RS2}$)) exceeds a first threshold (e.g., 0 or 0.2) otherwise a second relation applies.

An example of an expression defining Tm can be expressed as follows assuming $\alpha_2(T_{RS1}, T_{RS2}, T_G)$=MAX ($T_{RS1}$, $T_{RS2}$, $T_G$):

$$Tm=MAX(K_{21},K_{22}*K_{23}*MAX(T_{RS1},T_{RS2},T_G)) \qquad (5).$$

According to a third aspect of the first embodiment the measurement time (Tm) is function of at least the association, $\alpha_2(\cdot)$, between $T_{RS1}$, $T_{RS2}$, and periodicity ($T_{act}$) of WD 22 activity level. Examples of WD 22 activity levels include DRX, enhanced DRX (eDRX), a resource pattern for monitoring serving cell (e.g. control channel monitoring pattern) etc. Examples of periodicity include WD 22 DRX cycle length, eDRX cycle length, control channel monitoring periodicity (e.g., period with which the WD 22 is required to monitor a control channel e.g. PDCCH). An example of a general expression defining Tm when WD 22 is configured with a certain WD activity pattern (e.g. DRX, eDRX, etc.) can be expressed as follows:

$$Tm=f3(K_{31},K_{32},\alpha_3(T_{RS1},T_{RS2},T_{act})) \qquad (6),$$

where:
$K_{31}$ is related to minimum duration of Tm.
$K_{32}$ is a scaling factor. It relates to the number of RTT measurement samples used by WD 22 over Tm for performing the RTT measurement when WD 22 is configured with an activity level e.g. DRX cycle.
$T_{act}$ is the periodicity of the WD 22 or network node 16 activity level e.g. DRX cycle.

Examples of $\alpha_3$ are max, mean, maximum/minimum, ceil (maximum/minimum), least common multiple, e.g., LCM ($T_{RS1}$, $T_{RS2}$, $T_{act}$), modulus, etc., of $T_{RS1}$ and $T_{RS2}$ and $T_{act}$, or any function of these functions. The relation may also depend on a condition, e.g., a first relation applies when mod(max($T_{RS1}$, $T_{RS2}$)/min($T_{RS1}$, $T_{RS2}$)) exceeds a first threshold (e.g., 0 or 0.2) otherwise a second relation applies.

An example of an expression defining Tm can be expressed as follows assuming $\alpha_3(T_{RS1}, T_{RS2}, T_{act})$=MAX ($T_{RS1}$, $T_{RS2}$, $T_{act}$):

$$Tm=MAX(K_{31},K_{32}*MAX(T_{RS1},T_{RS2},T_{act})) \qquad (7).$$

According to a fourth aspect of the first embodiment, the measurement time (Tm) is function of at least the association, $\alpha_4(\cdot)$, between $T_{RS1}$, $T_{RS2}$, $T_G$ (if WD 22 is configured with gaps) and $T_{act}$ (if WD 22 is configured with the WD 22 activity level). An example of a general expression defining Tm when WD 22 is configured with gaps and also with a certain WD 22 activity pattern (e.g. DRX, eDRX etc.) can be expressed as follows:

$$Tm=f4(K_{41},K_{42},K_{43},\alpha_4(T_{RS1},T_{RS2},T_G,T_{act})) \qquad (8).$$

An example of an expression defining Tm can be expressed as follows assuming $\alpha_4(T_{RS1}, T_{RS2}, T_G, T_{act})$= MAX($T_{RS1}$, $T_{RS2}$, $T_G$, $T_{act}$):

$$Tm=MAX(K_{41},K_{42}*K_{43}*MAX(T_{RS1},T_{RS2},T_G,T_{act})) \qquad (9),$$

where:
$K_{41}$ is related to minimum duration of Tm,
$K_{42}$ is a first scaling factor. It relates to the number of RTT measurement samples used by WD 22 over Tm for performing the RTT measurement when gaps are used and WD 22 activity level is configured.
$K_{43}$ is a second scaling factor. It relates to the sharing of gaps for doing the same or different types of measurements on two or more carrier frequencies or frequency layers. $K_{43}$=1 if the all the gaps are used for the RTT measurement.

Examples of $\alpha_4$ are max, mean, maximum/minimum, ceil (maximum/minimum), least common multiple e.g. LCM ($T_{RS1}$, $T_{RS2}$, $T_G$, $T_{act}$), modulus, etc., of $T_{RS1}$ and $T_{RS2}$ and $T_G$ and $T_{act}$, or any function of these functions. The relation may also depend on a condition, e.g., a first relation applies when mod(max($T_{RS1}$, $T_{RS2}$)/min($T_{RS1}$, $T_{RS2}$)) exceed a first threshold (e.g., 0 or 0.2) otherwise a second relation applies.

According to a fifth aspect of the first embodiment, the measurement time (Tm) is function of any association between $T_{RS1}$ and $T_{RS2}$, provided $T_{RS1}$ and/or $T_{RS2}$ meet one or more criteria. If the one or more criteria are not met then Tm is not function of any of the associations $\alpha_1(\cdot)$, $\alpha_2(\cdot)$, $\alpha_3(\cdot)$ or $\alpha_4(\cdot)$. Examples of criteria include:

configured value of $T_{RS1}$,
configured value of $T_{RS2}$,
configured value of $T_G$,
configured value of $T_{act}$, and/or
relation or association between any two or more of the following parameters: $T_{RS1}$, $T_{RS2}$, $T_G$ and $T_{act}$.

In one example Tm is a function of $\alpha_1(\cdot)$ as in expressions (1, 2 or 3) provided that $T_{RS1}$ is larger than certain threshold ($H_{11}$) and/or $T_{RS2}$ is larger than certain threshold ($H_{12}$). Otherwise Tm is not function of $\alpha_1(\cdot)$, e.g., Tm=Kc: where Kc is a fixed value such as 400 ms.

In another example, if $T_{act}$ is larger than $T_{RS1}$ by certain margin ($H_{21}$) and/or $T_{RS2}$ is larger than certain threshold ($H_{22}$) then Tm is not a function of any association between $T_{RS1}$ and $T_{RS2}$; but Tm may be function of $T_{act}$. Otherwise Tm is a function of an association between at least $T_{RS1}$ and $T_{RS2}$ as in expressions (6, 7, 8 or 9 herein).

Network node 16 uses the results of the performed RTT measurement for one or more operational tasks. The measurement results may comprise, e.g., a measurement value, associated identity of Node2 (e.g. cell ID, beam ID, resource ID, resource set ID, PRS resource ID, PRS resource ID etc.), etc. Examples of tasks are:

Reporting one or more of the measurement results to one or more nodes, e.g. to a network node such as a base station, positioning node, or another WD 22, etc. Using the results for one or more internal procedures in the WD 22. Examples of such procedures are determining the WD 22 location, determining WD 22 timing with respect to another node, adapting the WD 22 timing, etc. Logging one or more measurement results for future use, e.g., for MDT, SON, positioning, collecting performance statistics.

Embodiments may be directed toward a method in network node 16 of performing multi-RTT measurement as function of RS1 and RS2 periods on multiple cells.

In a scenario related to another embodiment, network node 16 is configured to perform the RTT measurement over the measurement time (Tm) on multiple nodes in multi-RTT measurement scenario. This type of RTT measurement is called herein as multi-RTT measurement. More specifically network node 16 is configured to performed RTT measurement on signals operating between network node 16 and a set of 'k' different Node2s (Node21, Node22, ... , Node2k); where k>1. This embodiment is related to the arrangement shown in FIG. 12.

According to a basic concept of the second embodiment, Node1, e.g., network node 16, is configured to perform multi-RTT measurement over the measurement time (Tm), which is function of at least an association between a set $S1=\{T_{RS11}, T_{RS12}, \ldots, T_{RS1k}\}$ comprising periodicities of RSs transmitted by Node1 towards Node2s and a set $S2=\{T_{RS21}, T_{RS22}, \ldots, T_{RS2k}\}$ comprising periodicities of RSs transmitted by Node2s towards Node1. For example, $T_{RS11}$ is a periodicity of reference signal ($RS_{11}$) transmitted by Node1 towards Node21, $T_{RS12}$ is a periodicity of reference signal ($RS_{12}$) transmitted by Node1 towards Node22, and $T_{RS1k}$ is a periodicity of reference signal ($RS_{1k}$) transmitted by Node1 towards Node2k. Similarly, as an example, $T_{RS21}$ is a periodicity of reference signal (RS21) transmitted by Node2 towards Node1, $T_{RS22}$ is a periodicity of reference signal (RS22) transmitted by Node22 towards Node1, and $T_{RS2k}$ is a periodicity of reference signal ($RS_{2k}$) transmitted by Node2k towards Node1.

As part of the multi-RTT measurement procedure, network node 16 may perform a set of k different RTT measurements over the measurement time, Tm. For example, the RTT measurement ($RTT_k$) performed by Node1 on signals operating between Node1 and Node1k may comprise one or more measurement samples. Each measurement sample may comprise two timing measurement components as described herein. For example, each sample of the $RTT_k$ is function of two timing measurement components:

a first component comprising reception timing ($T_{RX\_k}$) of RS2k received by Node1 from Node2k, and
a second component comprising transmission timing ($T_{TX\_k}$) of $RS_{1k}$ transmitted by Node1.

According to an aspect of a second embodiment, Node1, e.g., network node 16, performs the multi-RTT measurement on k different Node2s without any measurement gaps. For example, the signals in set S1 and set S2 are transmitted and received by Node1 respectively in active bandwidth part of the serving cell of Node1. In this case the measurement time, Tm, for performing multi-RTT measurement on k different Node2s, can be expressed by the following generic expression:

$$Tm=g_1(L_{11},L_{12},L_{13},\beta_1(T_{RS11}, \ldots, T_{RS1k}, T_{RS21}, \ldots, T_{RS2k})) \quad (10),$$

where:

$L_{11}$ is related to a minimum duration of Tm without gaps and in non-DRX or when DRX cycle is below or equal to a certain DRX threshold (e.g. 40 ms).

$L_{12}$ is a first scaling factor. It relates to the number of RTT measurement samples used by the WD 22 over Tm for performing the RTT measurement without gaps and in non-DRX or when DRX cycle is below or equal to the DRX threshold.

$L_{13}$ is a second scaling factor. It relates to the number of RTT measurements to be performed by network node 16 as part of the multi-RTT measurement procedure without gaps and in non-DRX or when DRX cycle is below or equal to the DRX threshold. As one case $L_{13}=k$.

In one example, set $S1=\{T_{RS11}, T_{RS12}, \ldots, T_{RS1k}\}$ corresponds to SRS resource periodicities ($T_{SRS}$) and set $S2=\{T_{RS21}, T_{RS22}, \ldots, T_{RS2k}\}$ corresponds to PRS resource periodicities ($T_{per}^{PRS}$) respectively, e.g. when Node1 is WD 22 and Node21, ... , Node2k are BSs such as network node 16. In another example, both set $S1=\{T_{RS11}, T_{RS12}, \ldots, T_{RS1k}\}$ and set $S2=\{T_{RS21}, T_{RS22}, \ldots, T_{RS2k}\}$ correspond to SRS resource periodicities, $\{T_{SRS11}, T_{SRS12}, \ldots, T_{SRS1k}\}$ and $\{T_{SRS21}, T_{SRS22}, \ldots, T_{SRS2k}\}$, respectively, e.g., when Node1 is WD 22a and Node21, ... , Node2k are WDs capable of D2D operation.

$\beta_1(\cdot)$ associates set S1 and set S2 based on a relation. Examples of relation are maximum, mean, maximum/minimum, ceil (maximum/minimum), least common multiple e.g. LCM(S1,S2), modulus, etc., of sets S1 and S2, or any function of these functions. The relation may also depend on a condition, e.g., a first relation applies when mod(max(S1, S2)/min(S1,S2)) exceeds a first threshold (e.g., 0 or 0.2) otherwise a second relation applies.

An example of the measurement time, Tm, for performing multi-RTT measurement on k different Node2s, can be expressed by the following specific expression:

$$Tm=MAX(L_{11},L_{12}*L_{13}*MAX(T_{RS11}, \ldots, T_{RS1k}, T_{RS21}, \ldots, T_{RS2k})) \quad (11).$$

In general, periodicities of the RS transmitted by Node1 towards Node2s can be different. In another example, the periodicities of the RS transmitted by Node1, e.g., network node 16, towards some of the Node2s can be the same while towards the other Node2s can be different.

As one case, Node1 may transmit the same RS (e.g., SRS) towards all Node2s. In one example the periodicity of the RS transmitted by Node1 toward all Node2s is also the same. This can especially be the case when multi-RTT measurements are performed on k number of cells operating on the same frequency layer, e.g. RTT measurements done on a serving cell and one or more neighbor cells on the same frequency layer such as the serving layer. In this case: $T_{RS11}=T_{RS12}=,\ldots,=T_{RS1k}=T_{RS1}$. The corresponding measurement time, Tm, may be expressed by the following expression:

$$Tm=MAX(L_{11},L_{12}*L_{13}*MAX(T_{RS1},T_{RS1k},T_{RS21},\ldots,T_{RS2k},T_G)) \quad (12).$$

According to a second aspect of the second embodiment, Node1, e.g., network node 16, performs the multi-RTT measurement on k different Node2s using measurement gaps. For example, Node1 may have to receive the signals in set S2 from Node2s during the measurement gaps. In this case, the measurement time, Tm, for performing multi-RTT measurement on k different Node2, can be expressed by the following generic expression:

$$Tm=g_2(L_{21},L_{22},L_{23},L_{24},\beta_2(T_{RS11},\ldots,T_{RS1k},T_{RS21},\ldots,T_{RS2k},T_G)) \quad (13),$$

where:

L_{21} is related to minimum duration of Tm when gaps are used and in non-DRX or when DRX cycle is below or equal to certain DRX threshold.

L_{22} is a first scaling factor. It relates to the number of RTT measurement samples used by the WD 22 over Tm for performing the RTT measurement when gaps are used and in non-DRX or when DRX cycle is below or equal to certain DRX threshold.

L_{23} is a second scaling factor. It relates to the number of RTT measurements to be performed by network node 16 as part of the multi-RTT measurement procedure when gaps are used and in non-DRX or when DRX cycle is below or equal to certain DRX threshold. As one case $L_{13}=k$.

L_{24} is a third scaling factor. It relates to the sharing of gaps for doing the same or different types of measurements on two or more carrier frequencies or frequency layers when gaps are used and in non-DRX or when DRX cycle is below or equal to certain DRX threshold. $K_{24}=1$ if the all the gaps are used for the RTT measurement.

$\beta_2(\cdot)$ associates set S1, set S2 and $T_G$ based on a relation. Examples of the relations are maximum, mean, maximum/minimum, ceil (maximum/minimum), least common multiple, e.g., LCM(S1,S2, $T_G$), modulus, etc., of sets S1 and S2 and $T_G$, or any function of these functions. The relation may also depend on a condition, e.g., a first relation applies when mod(max(S1,S2)/min(S1,S2)) exceeds a first threshold (e.g., 0 or 0.2) otherwise a second relation applies.

An example of the measurement time, Tm, for performing multi-RTT measurement on k different Node2s when the measurement is done in gaps, can be expressed by the following specific expression:

$$Tm=MAX(L_{21},L_{22}*L_{23}*L_{24}*MAX(T_{RS11},\ldots,T_{RS1k},T_{RS21},\ldots,T_{RS2k},T_G)) \quad (14).$$

Also, in an exemplary case, Node1 may transmit the same RS (e.g. SRS) towards all Node2s and therefore $T_{RS11}=T_{RS12},\ldots,=T_{RS1k}=T_{RS1}$. In this case the corresponding measurement time, Tm, is expressed by the following expression:

$$Tm=MAX(L_{21},L_{22}*L_{23}*L_{24}*MAX(T_{RS11},T_{RS1k},T_{RS21},\ldots,T_{RS2k},T_G)) \quad (15).$$

According to a third aspect of the second embodiment, Node1 performs the multi-RTT measurement on k different Node2s when configured with WD 22 activity level e.g. DRX cycle, eDRX cycle etc. For example, to save power the Node1 may transmit and/or receive signals in set S1 and set S2 as function of DRX cycle as well as periodicities of signals in set S1 and set S2. In this case the measurement time, Tm, for performing multi-RTT measurement on k different Node2, can be expressed by the following generic expression:

$$Tm=g_3(L_{31},L_{32},L_{33},\beta_3(T_{RS11},\ldots,T_{RS1k},T_{RS21},\ldots,T_{RS2k},T_{act})) \quad (16)$$

where:

L_{31} is related to a minimum duration of Tm in DRX or when DRX is above a certain threshold and no gaps are used.

L_{32} is a first scaling factor. It relates to the number of RTT measurement samples used by the WD 22 over Tm for performing the RTT measurement in DRX in DRX or when DRX is above a certain threshold and no gaps are used.

L_{33} is a second scaling factor. It relates to the number of RTT measurements to be performed by Node1 as part of the multi-RTT measurement procedure in DRX or when DRX is above certain threshold and no gaps are used. As one case $L_{33}=k$.

$\beta_3(\cdot)$ associates set S1, set S2 and $T_{act}$ based on a relation. Examples of the relations are maximum, mean, maximum/minimum, ceil (maximum/minimum), least common multiple e.g. LCM(S1,S2, $T_{act}$), modulus, etc., of sets S1 and S2 and $T_{act}$, or any function of these functions. The relation may also depend on a condition, e.g., a first relation applies when mod(max(S1,S2)/min(S1,S2)) exceeds a first threshold (e.g., 0 or 0.2) otherwise a second relation applies.

An example of the measurement time, Tm, for performing multi-RTT measurement on k different Node2s when the measurement is done in DRX, can be expressed by the following specific expression:

$$Tm=MAX(L_{31},L_{32}*L_{33}*MAX(T_{RS11},\ldots,T_{RS1k},T_{RS21},\ldots,T_{RS2k},T_{act})) \quad (17).$$

Also, as one case, Node1 may transmit the same RS (e.g. SRS) towards all Node2s and therefore $T_{RS11}=T_{RS12}=,\ldots,=T_{RS1k}=T_{RS1}$. In this case, the corresponding measurement time, Tm, may be expressed by the following expression:

$$Tm=MAX(L_{31},L_{32}*L_{33}*MAX(T_{RS1},T_{RS1k},T_{RS21},\ldots,T_{RS2k},T_{act})) \quad (18).$$

According to a fourth aspect of the second embodiment, Node1 performs the multi-RTT measurement on k different Node2s using measurement gaps, and may also be configured with WD 22 activity level, e.g., DRX cycle, eDRX cycle, etc. For example, to save power, the network node 16 may transmit and/or receive signals in set S1 and set S2 as function of DRX cycle as well as periodicities of signals in set S1 and set S2 and the measurement gap periodicity. In this case, the measurement time, Tm, for performing multi- RTT measurement on k different Node2, can be expressed by the following generic expression:

$$Tm = g_4(L_{41}, L_{42}, L_{43}, L_{44}, \beta_4(T_{RS11}, \ldots, T_{RS1k}, T_{RS21}, \ldots, T_{RS2k}, T_G, T_{act}))) \qquad (19),$$

where:

L$_{41}$ is related to minimum duration of Tm in DRX or when DRX is above certain threshold and gaps are used.

L$_{42}$ is a first scaling factor. It relates to the number of RTT measurement samples used by the WD 22 over Tm for performing each RTT measurement in DRX in DRX or when DRX is above certain threshold and gaps are used.

L$_{43}$ is a second scaling factor. It relates to the number of RTT measurements to be performed by network node 16 as part of the multi-RTT measurement procedure in DRX or when DRX is above certain threshold and gaps are used. In one case, L$_{43}$=k.

$\beta_4(\cdot)$ associates set S1, set S2, T$_{act}$ and T$_G$ based on a relation. Examples of the relations are maximum, mean, maximum/minimum, ceil (maximum/minimum), least common multiple, e.g., LCM(S1,S2, T$_{act}$, T$_G$), modulus, etc., of sets S1 and S2 and T$_{act}$ and T$_G$, or any function of these functions. The relation may also depend on a condition, e.g., a first relation applies when mod(max(S1,S2)/min(S1,S2)) exceeds a first threshold (e.g., 0 or 0.2) otherwise a second relation applies An example of the measurement time, Tm, for performing multi-RTT measurement on k different Node2*s* when the measurement is done in DRX and using gaps, can be expressed by the following specific expression:

$$Tm = MAX(L_{41}, L_{42}*L_{43}*L_{44}*MAX(T_{RS11}, \ldots, T_{RS1k}, T_{RS21}, \ldots, T_{RS2k}, T_G, T_{act})) \qquad (20).$$

Also, in one case, Node1 transmits the same RS (e.g. SRS) towards all Node2*s* and therefore T$_{RS11}$= T$_{RS12}$=, . . . , =T$_{RS1k}$=T$_{RS1}$. In this case, the corresponding measurement time, Tm, may be expressed by the following expression:

$$Tm = MAX(L_{41}, L_{42}*L_{43}*L_{44}*MAX(T_{RS1}, T_{RS1k}, T_{RS21}, \ldots, T_{RS2k}, T_G, T_{act})) \qquad (21).$$

According to a fifth aspect of the second embodiment, the measurement time (Tm) is function of any association between set S1 and set S2, provided set S1 and/or set S2 meet one or more criteria. If the one or more criteria are not met, then Tm is not function of any of the associations $\beta_1(\cdot)$, $\beta_2(\cdot)$, $\beta_3(\cdot)$ or $\beta_4(\cdot)$. Examples of criteria include:

configured values of one or periodicities of RS transmitted by Node1 in set S1, configured values of one or periodicities of RS transmitted by Node2*s* in set S2, configured value of T$_G$, configured value of T$_{act}$, and/or relation or association between any two or more of the following parameters: set S1, set S2, T$_G$ and T$_{act}$.

In one example, Tm is a function of $\beta1(\cdot)$ as in expressions (10, 11 or 12) provided that at least one periodicity of the RS in set S1 is larger than a certain threshold (G11) and/or at least one periodicity of the RS in set S2 is larger than a certain threshold (G12). Otherwise Tm is not function of $\beta_1(\cdot)$ e.g. Tm=Kd: where Kd is a fixed value such as 1000 ms.

In another example, if T$_{act}$ is larger than at least one periodicity of the RS in set S1 by certain margin (G21) and/or at least one periodicity of the RS in set S2 is larger than certain threshold (G22), then Tm is not a function of any association between set S1 and set S2; but Tm may be function of T$_{act}$. Otherwise, Tm is a function of an association between at least set S1 and set S2 as in expressions (17-20).

The network node 16 may use the results of the performed multi-RTT measurement for one or more operational tasks. The measurement results may include, e.g., measurement values, associated identities of Node2*s* (e.g. cell IDs), etc. Examples of tasks may be similar to those described with respect to the previous embodiments. Some embodiments may include one or more of the following:

EMBODIMENTS

Embodiment A1. A network node configured to communicate with at least one of a second network node and a wireless device (WD), the network node configured to, and/or comprising a radio interface and/or comprising processing circuitry configured to:

perform at least one round trip time (RTT) measurement over a measurement time (Tm), the at least one RTT measurement being a function of at least an association between a periodicity (T$_{RS1}$) of a first reference signal (RS1) transmitted from the network node to the at least one of a second network node and a WD and a periodicity (T$_{RS2}$) of a second reference signal (RS2) transmitted from the at least one of a second network node and a WD to the network node.

Embodiment A2. The network node of Embodiment A1, wherein RS1 further comprises a sounding reference signal (SRS) and RS2 further comprises a positioning reference signal (PRS).

Embodiment A3. The network node of Embodiment A1, wherein RS1 further comprises a positioning reference signal (PRS) and the RS2 further comprises a sounding reference signal (SRS).

Embodiment A4. The network node of any one of Embodiments A1-A3, wherein Tm is further a function of at least one of the periodicity of the WD's activity level and a measurement gap.

Embodiment A5. The network node of any one of Embodiments A1-A4, wherein RS1 is specific to the WD.

Embodiment A6. The network node of any one of Embodiments A1-A5, wherein the processing circuitry is further configured to transmit RS1 based on a timing advance with respect to the at least one of a second network node and a WD.

Embodiment A7. The network node of any one of Embodiments A1-A6, wherein the network node and/or the radio interface and/or the processing circuitry is further configured to perform an RTT measurement over Tm between the network node and a plurality of other nodes.

Embodiment A8. The network node of Embodiment A7, wherein the network node and/or the radio interface and/or the processing circuitry is further configured to one or more of:

perform multiple RTT measurements between the network node and the plurality of other nodes without any measurement gaps between the RTT measurements:

perform multiple RTT measurements between the network node and the plurality of other nodes with measurement gaps between the RTT measurements; and configure a WD activity level when performing the multiple RTT measurements.

Embodiment B1. A method implemented in a network node, the method comprising: performing at least one round trip time (RTT) measurement over a measurement time (Tm), the at least one RTT measurement being a function of at least an association between a periodicity ($T_{RS1}$) of a first reference signal (RS1) transmitted from the network node to at least one of a second network node and a wireless device (WD) and a periodicity ($T_{RS2}$) of a second reference signal (RS2) transmitted from the at least one of a second network node and a WD to the network node.

Embodiment B2. The method of Embodiment B1, wherein RS1 further comprises a sounding reference signal (SRS) and RS2 further comprises a positioning reference signal (PRS).

Embodiment B3. The method of Embodiment B1, wherein RS1 further comprises a positioning reference signal (PRS) and the RS2 further comprises a sounding reference signal (SRS).

Embodiment B4. The method of any one of Embodiments B1-B3, wherein Tm is further a function of at least one of the periodicity of a WD's activity level and a measurement gap.

Embodiment B5. The method of any one of Embodiments B1-B4, wherein RS1 is specific to a WD.

Embodiment B6. The method of any one of Embodiments B1-B5, further comprising transmitting RS1 based on a timing advance with respect to the at least one of a second network node and a WD.

Embodiment B7. The method of any one of Embodiments B1-B6, further comprising performing an RTT measurement over Tm between the network node and a plurality of other nodes.

Embodiment B8. The method of Embodiment B7, further comprising one or more of:
  performing multiple RTT measurements between the network node and the plurality of other nodes without any measurement gaps between the RTT measurements;
  performing multiple RTT measurements between the network node and the plurality of other nodes with measurement gaps between the RTT measurements; and
  configuring a WD activity level when performing the multiple RTT measurements.

Embodiment C1. A wireless device (WD) configured to communicate with at least one of a network node and a second WD, the WD configured to, and/or comprising a radio interface and/or processing circuitry configured to:
  perform at least one round trip time (RTT) measurement over a measurement time (Tm), the at least one RTT measurement being a function of at least an association between a periodicity ($T_{RS1}$) of a first reference signal (RS1) transmitted from the WD to the at least one of a network node and a second WD and a periodicity ($T_{RS2}$) of a second reference signal (RS2) transmitted from the at least one of a network node and a second WD to the WD.

Embodiment C2. The WD of Embodiment C1, wherein RS1 further comprises a sounding reference signal (SRS) and RS2 further comprises a positioning reference signal (PRS).

Embodiment C3. The WD of Embodiment C1, wherein RS1 further comprises a positioning reference signal (PRS) and the RS2 further comprises a sounding reference signal (SRS).

Embodiment C4. The WD of any one of Embodiments C1-C3, wherein Tm is further a function of at least one of the periodicity of the WD's activity level and a measurement gap.

Embodiment C5. The WD of any one of Embodiments C1-C4, wherein RS1 is specific to the WD.

Embodiment C6. The WD of any one of Embodiments C1-C5, wherein the WD and/or the radio interface and/or the processing circuitry is further configured to transmit RS1 based on a timing advance with respect to the at least one of a network node and a second WD.

Embodiment C7. The WD of any one of Embodiments C1-C6, wherein the WD and/or the radio interface and/or the processing circuitry is further configured to perform an RTT measurement over Tm between the WD and a plurality of other nodes.

Embodiment C8. The WD of Embodiment C7, wherein the WD and/or the radio interface and/or the processing circuitry is further configured to one or more of:
  perform multiple RTT measurements between the WD and the plurality of other nodes without any measurement gaps between the RTT measurements:
  perform multiple RTT measurements between the WD and the plurality of other nodes with measurement gaps between the RTT measurements; and
  configure a WD activity level when performing the multiple RTT measurements.

Embodiment D1. A method implemented in a wireless device (WD), the method comprising:
  performing at least one round trip time (RTT) measurement over a measurement time (Tm), the at least one RTT measurement being a function of at least an association between a periodicity ($T_{RS1}$) of a first reference signal (RS1) transmitted from the WD to at least one of a network node and a second WD and a periodicity ($T_{RS2}$) of a second reference signal (RS2) transmitted from the at least one of a network node and a second WD to the WD.

Embodiment D2. The method of Embodiment D1, wherein RS1 further comprises a sounding reference signal (SRS) and RS2 further comprises a positioning reference signal (PRS).

Embodiment D3. The method of Embodiment D1, wherein RS1 further comprises a positioning reference signal (PRS) and the RS2 further comprises a sounding reference signal (SRS).

Embodiment D4. The method of any one of Embodiments D1-D3, wherein Tm is further a function of at least one of the periodicity of the WD's activity level and a measurement gap.

Embodiment D5. The method of any one of Embodiments D1-D4, wherein RS1 is specific to the WD.

Embodiment D6. The method of any one of Embodiments D1-D5 further comprising transmitting RS1 based on a timing advance with respect to the at least one of a network node and a second WD.

Embodiment D7. The method of any one of Embodiments D1-D6, further comprising performing an RTT measurement over Tm between the WD and a plurality of other nodes.

Embodiment D8. The method of Embodiment D7, further comprising one or more of:
  performing multiple RTT measurements between the WD and the plurality of other nodes without any measurement gaps between the RTT measurements:
  performing multiple RTT measurements between the WD and the plurality of other nodes with measurement gaps between the RTT measurements; and
  configuring a WD activity level when performing the multiple RTT measurements.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, the method comprising:

performing at least one round trip time, RTT, measurement over a measurement time, $T_m$, the measurement time being a function of at least an association between a first periodicity, $T_{RS1}$, of a first reference signal and a second periodicity, $T_{RS2}$, of a second reference signal, the first reference signal being transmitted from the WD to a network node and the second reference signal being received by the WD from the network node, the first reference signal being a sounding reference signal, SRS, the second reference signal being a positioning reference signal, PRS, the first periodicity being a periodicity of the SRS and the second periodicity being a periodicity of the PRS; and using a result of the at least one RTT measurement for one or more operational tasks.

2. The method of claim 1, wherein the association between the first periodicity and the second periodicity comprises at least one relation associated with the first periodicity and the second periodicity.

3. The method of claim 2, wherein the at least one relation, includes a maximum of the first periodicity and the second periodicity.

4. The method of claim 2, wherein the at least one relation includes at least one of:

a minimum of the first periodicity and the second periodicity; and a difference between the first periodicity and the second periodicity.

5. The method of claim 2, wherein the at least one relation includes at least one of:

a mean of at least the first periodicity and the second periodicity;

a least common multiple of at least the first periodicity and the second periodicity; and a modulus operation comprising the first periodicity and the second periodicity.

6. The method of claim 1, wherein the measurement time is further the function of at least one of: a periodicity associated with an activity level of the WD, a measurement gap and a measurement gap periodicity.

7. A method implemented in a network node, the method comprising:

performing at least one round trip time, RTT, measurement over a measurement time, the measurement time being a function of at least an association between a first periodicity of a first reference signal and a second periodicity of a second reference signal, the first reference signal being received by the network node from a wireless device, WD, and the second reference signal being transmitted from the network node to the WD, the first reference signal being a sounding reference signal, SRS, the second reference signal being a positioning reference signal, PRS, the first periodicity being a periodicity of the SRS and the second periodicity being a periodicity of the PRS; and using the at least one RTT measurement for an operational task.

8. The method of claim 7, wherein the association between the first periodicity and the second periodicity comprises at least one relation associated with the first periodicity and the second periodicity.

9. The method of claim 8, wherein the at least one relation includes a maximum of the first periodicity and the second periodicity.

10. The method of claim 8, wherein the at least one relation depends on a condition.

11. The method of claim 10, wherein a first relation is used when the condition is met; otherwise, a second relation is used.

12. The method of claim 7, wherein the measurement time is further the function of at least one of a minimum duration for the measurement time and a scaling factor.

13. The method of claim 12, wherein the measurement time is a maximum of the association and the at least one of the minimum duration for the measurement time and the scaling factor.

14. A wireless device, WD, configured to communicate with a network node, the WD comprising processing circuitry, the processing circuitry configured to cause the WD to:

perform at least one round trip time, RTT, measurement over a measurement time, $T_m$, the measurement time being a function of at least an association between a first periodicity, $T_{RS1}$, of a first reference signal and a second periodicity, $T_{RS2}$, of a second reference signal, the first reference signal being transmitted from the WD to a network node and the second reference signal being received by the WD from the network node, the first reference signal being a sounding reference signal, SRS, the second reference signal being a positioning reference signal, PRS, the first periodicity being a periodicity of the SRS and the second periodicity being a periodicity of the PRS; and use a result of the at least one RTT measurement for one or more operational tasks.

15. The WD of claim 14, wherein the measurement time is further the function of at least one of a minimum duration for the measurement time and a scaling factor.

16. The WD of claim 15, wherein the measurement time is a maximum of the association and the at least one of the minimum duration for the measurement time and the scaling factor.

17. The WD of claim 14, wherein the processing circuitry is configured to cause the WD to perform the at least one RTT measurement by being configured to cause the WD to perform multiple RTT measurements associated with multiple different nodes.

18. The WD of claim 14, wherein the one or more operational tasks comprising one or more of: reporting the results of the at least one RTT measurement to a network node, using the results of the at least one RTT measurement for positioning of the WD and using the results of the at least one RTT measurement for collecting performance statistics.

19. A network node configured to communicate with a wireless device, WD, the network node comprising processing circuitry, the processing circuitry configured to cause the network node to:

perform at least one round trip time, RTT, measurement over a measurement time, the measurement time being a function of at least an association between a first periodicity of a first reference signal and a second periodicity of a second reference signal, the first reference signal being received by the network node from a wireless device, WD, and the second reference signal being transmitted from the network node to the WD, the first reference signal being a sounding reference signal, SRS, the second reference signal being a positioning reference signal, PRS, the first periodicity being a periodicity of the SRS and the second periodicity is a periodicity of the PRS; and use the at least one RTT measurement for an operational task.

20. The network node of claim 19, wherein the processing circuitry is configured to cause the network node to perform the at least one RTT measurement by being configured to cause the network node to perform multiple RTT measurements associated with multiple different nodes.

21. The network node of claim 19, wherein the one or more operational tasks comprise one or more of: reporting the results of the at least one RTT measurement to another network node, using the results of the at least one RTT measurement for positioning of the WD and using the results of the at least one RTT measurement for collecting performance statistics.

* * * * *